US012569998B2

(12) United States Patent
Matsuda et al.

(10) Patent No.: US 12,569,998 B2
(45) Date of Patent: Mar. 10, 2026

(54) PATH GENERATION DEVICE, PATH GENERATION METHOD, AND PATH GENERATION PROGRAM

(71) Applicant: KAWASAKI JUKOGYO KABUSHIKI KAISHA, Kobe (JP)

(72) Inventors: Kippei Matsuda, Kobe (JP); Toshiyuki Homma, Kobe (JP); Yuki Takayama, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 255 days.

(21) Appl. No.: 18/271,243

(22) PCT Filed: Jan. 12, 2021

(86) PCT No.: PCT/JP2021/000734
§ 371 (c)(1),
(2) Date: Jul. 7, 2023

(87) PCT Pub. No.: WO2022/153374
PCT Pub. Date: Jul. 21, 2022

(65) Prior Publication Data
US 2024/0058961 A1 Feb. 22, 2024

(51) Int. Cl.
B25J 9/16 (2006.01)

(52) U.S. Cl.
CPC ........... B25J 9/1666 (2013.01); B25J 9/1697 (2013.01); B25J 9/1676 (2013.01); G05B 2219/40317 (2013.01); G05B 2219/40442 (2013.01); G05B 2219/40477 (2013.01); G05B 2219/45063 (2013.01)

(58) Field of Classification Search
CPC ...... B25J 9/1666; B25J 9/1697; B25J 9/1676; G05B 2219/40317; G05B 2219/40442; G05B 2219/40477; G05B 2219/45063
See application file for complete search history.

(56) References Cited

U.S. PATENT DOCUMENTS

| 10,303,180 | B1 * | 5/2019 | Prats | G05D 1/0212 |
| 10,671,081 | B1 | 6/2020 | Prats | |
| 2019/0193267 | A1 * | 6/2019 | Peng | B25J 9/1664 |
| 2021/0093397 | A1 * | 4/2021 | Huang | B25J 9/04 |
| 2024/0009851 | A1 * | 1/2024 | Mousavian | B25J 9/1697 |
| 2024/0051135 | A1 * | 2/2024 | Miyamoto | G06V 20/52 |

FOREIGN PATENT DOCUMENTS

JP          2013-246553 A     12/2013

* cited by examiner

*Primary Examiner* — Khoi H Tran
(74) *Attorney, Agent, or Firm* — XSENSUS LLP

(57) ABSTRACT

A path generator includes an object setter that sets an object model; a device setter that sets a device model as a model of a robot arm; a path generator that generates a path of the robot arm stepwise; and an interference determiner that performs interference determination on the object model and the device model after having moved along the path, based on a distance between the object model and the device model. If it is determined that there is a possibility of interference between the object model and the device model, at least one of the object setter or the device setter increases a density of point groups of the point group model, and performs interference determination by using the point group model with the increased density of the point groups. If determined that that there is no possibility of interference, the path generator generates a next path.

15 Claims, 8 Drawing Sheets

PATH GENERATION DEVICE, PATH GENERATION METHOD, AND PATH GENERATION PROGRAM

CROSS-REFERENCE TO RELATED APPLICATION

The present application is based on PCT filing PCT/JP2021/000734, filed Jan. 12, 2021, the entire contents of which are incorporated herein by reference.

FIELD

The present disclosure relates to a path generator, a path generation method, and a path generation program.

BACKGROUND

A technique for generating a path of a mover has been known to date. Patent Document 1, for example, discloses a device that plans a path of a robot with determination of interference between the robot and an obstacle.

CITATION LIST

Patent Document

Patent Document 1: Japanese Patent Application Publication No. 2013-246553

SUMMARY

To generate a path of a mover, it is necessary to determine interference between an object such as an obstacle and a mover as described in the device of Patent Document 1. The interference determination is performed multiple times in generating a path. For example, in the case of generating a path from a predetermined start position to an end position, interference determination is performed at multiple points on the path. If it is determined in the interference determination that the object and the mover interfere with each other, the path is changed to another path, and interference determination is performed again. Interference determination is generally performed by calculating a distance between an object and a mover. As described above, since interference determination is performed multiple times in generating a path, if a calculation time for the distance between the object and the mover is long, a time for generating the path becomes long. On the other hand, if the calculation of the distance between the object and the mover is simplified to reduce the time for path generation, accuracy in interference determination on the object and the mover degrades.

It is therefore an object of the present disclosure to achieve both reduction of a time for interference determination and enhancement of accuracy.

A path generator according to the present disclosure is a path generator for generating a path of a mover, and includes: an object setter that sets an object model as a model of an object included in a layout space where the mover is located; a device setter that sets a device model as a model of the mover in the layout space; a path generator that generates a path of the mover stepwise; and an interference determiner that determines interference determination on the object model and the device model after having moved along the path, based on a distance between the object model and the device model, wherein at least one of the object model or the device model is a point group model formed of point groups, if the interference determiner determines that there is a possibility of interference, at least one of the object setter or the device setter increases a density of the point groups of the point group model, and the interference determiner performs the interference determination again by using the point group mode with the increased density of the point groups, and if the interference determiner determines that there is no possibility of interference, the path generator generates a next path.

A path generation method according to the present disclosure is a path generation method for generating a path of a mover and includes: setting an object model as a model of an object included in a layout space where the mover is located; setting a device model as a model of the mover in the layout space; generating a path of the mover stepwise; and performing interference determination on the object model and the device model after having moved along the path, based on a distance between the object model and the device model, wherein at least one of the object model or the device model is a point group model formed of point groups, if it is determined in the interference determination that there is a possibility of interference, a density of the point groups of the point group model is increased in at least one of the setting the object model or the setting the device model, and in the performing the interference determination, the interference determination is performed again by using the point group model with the increased density of the point groups, and in the generating the path, if it is determined that there is no possibility of interference, a next path is generated.

A path generation program according to the present disclosure causes a computer, in order to generate an action of a mover, to perform the functions of: setting an object model as a model of an object included in a layout space where the mover is located; setting a device model as a model of the mover in the layout space; generating a path of the mover stepwise; and performing interference determination on the object model and the device model after having moved along the path, based on a distance between the object model and the device model, wherein at least one of the object model or the device model is a point group model formed of point groups, if it is determined in the interference determination that there is a possibility of interference, at least one of the function of setting the object model or the function of setting the device model increases a density of the point groups of the point group model, and the function of performing the interference determination performs the interference determination again by using the point group mode with the increased density of the point groups, and if it is determined in the interference determination that there is no possibility of interference, the function of generating the path generates a next path.

The path generator described above can achieve both reduction of the time for interference determination and enhancement of accuracy.

The path generation method described above can achieve both reduction of the time for interference determination and enhancement of accuracy.

The path generation program can achieve both reduction of the time for interference determination and enhancement of accuracy.

DESCRIPTION OF EMBODIMENTS

Figure 1:
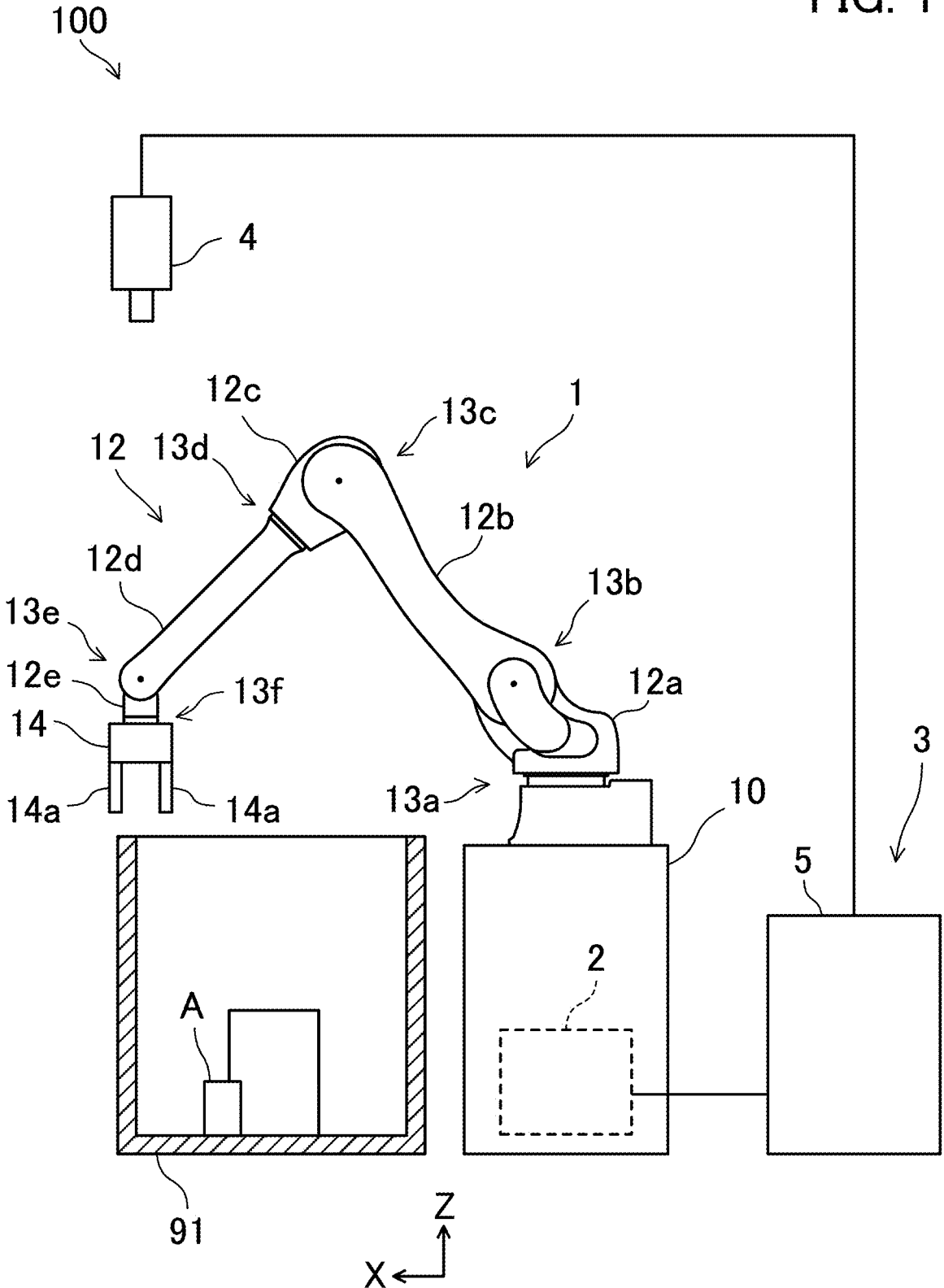
FIG. 1 is a schematic view illustrating a configuration of a robot system.

An exemplary embodiment will be described in detail hereinafter with reference to the drawings. FIG. 1 is a schematic view illustrating a configuration of a robot system 100.

The robot system 100 includes a robot 1 and a path generator 3 that generates a path of the robot 1. The path generator 3 includes a controller 5. The path generator 3 may include a three-dimensional vision sensor 4 that acquires information on a layout space where the robot 1 is located. In the robot system 100, the controller 5 generates a path of the robot 1 with reference to a detection result of the three-dimensional vision sensor 4 and controls an action of the robot 1.

In this example, the robot 1 carries out an object from a container 91 or carries an object into the container 91.

In this example, the robot 1 is an industrial robot. The robot 1 includes a robot arm 12 and a robot controller 2 that controls the entire robot 1. The robot arm 12 includes a hand 14 as an end effector. The robot arm 12 holds an object with the hand 14. The robot 1 is an example of a mover. More specifically, the robot arm 12 is an example of a mover.

In the space where the robot 1 is located, a robot coordinate system of three orthogonal axes is defined. For example, a Z axis is defined in the top-bottom directions, and an X axis and a Y axis are defined to be orthogonal to each other in the horizontal directions.

The robot arm 12 moves in three dimensions. Specifically, the robot arm 12 performs actions including a translation motion of at least three degrees of freedom. In this example, the robot arm 12 is a vertical articulated robot arm. The robot arm 12 is supported by a base 10. The robot arm 12 includes links and joints coupling the links.

Specifically, the robot arm 12 includes a first link 12a coupled to the base 10, a second link 12b coupled to the first link 12a, a third link 12c coupled to the second link 12b, a fourth link 12d coupled to the third link 12c, and a fifth link 12e coupled to the fourth link 12d. The hand 14 can also be regarded as a link of the robot arm 12.

Specifically, the base 10 and the first link 12a are coupled to each other through a first joint 13a rotatable about an axis extending in the vertical direction. The first link 12a and the second link 12b are coupled to each other through a second joint 13b rotatable about an axis extending in the horizontal direction. The second link 12b and the third link 12c are coupled to each other through a third joint 13c rotatable about an axis extending in the horizontal direction. The third link 12c and the fourth link 12d are coupled to each other through a fourth joint 13d rotatable about an axial center of the fourth link 12d (i.e., direction in which the fourth link 12d extends). The fourth link 12d and the fifth link 12e are coupled to each other through a fifth joint 13e rotatable about an axis orthogonal to the axial center of the fourth link 12d.

The hand 14 is coupled to a front end of the robot arm 12, that is, the fifth link 12e. The fifth link 12e and the hand 14 are coupled to each other through a sixth joint 13f to be rotatable about a predetermined axis. The hand 14 includes two fingers 14a that are allowed to be opened and closed. The two fingers 14a are driven to be opened and closed by an actuator such as an air cylinder.

The robot arm 12 includes servo motors 15 (see FIG. 2) that rotationally drive the joints. Each of the servo motors 15 includes an encoder 15a (see FIG. 2).

Figure 2:
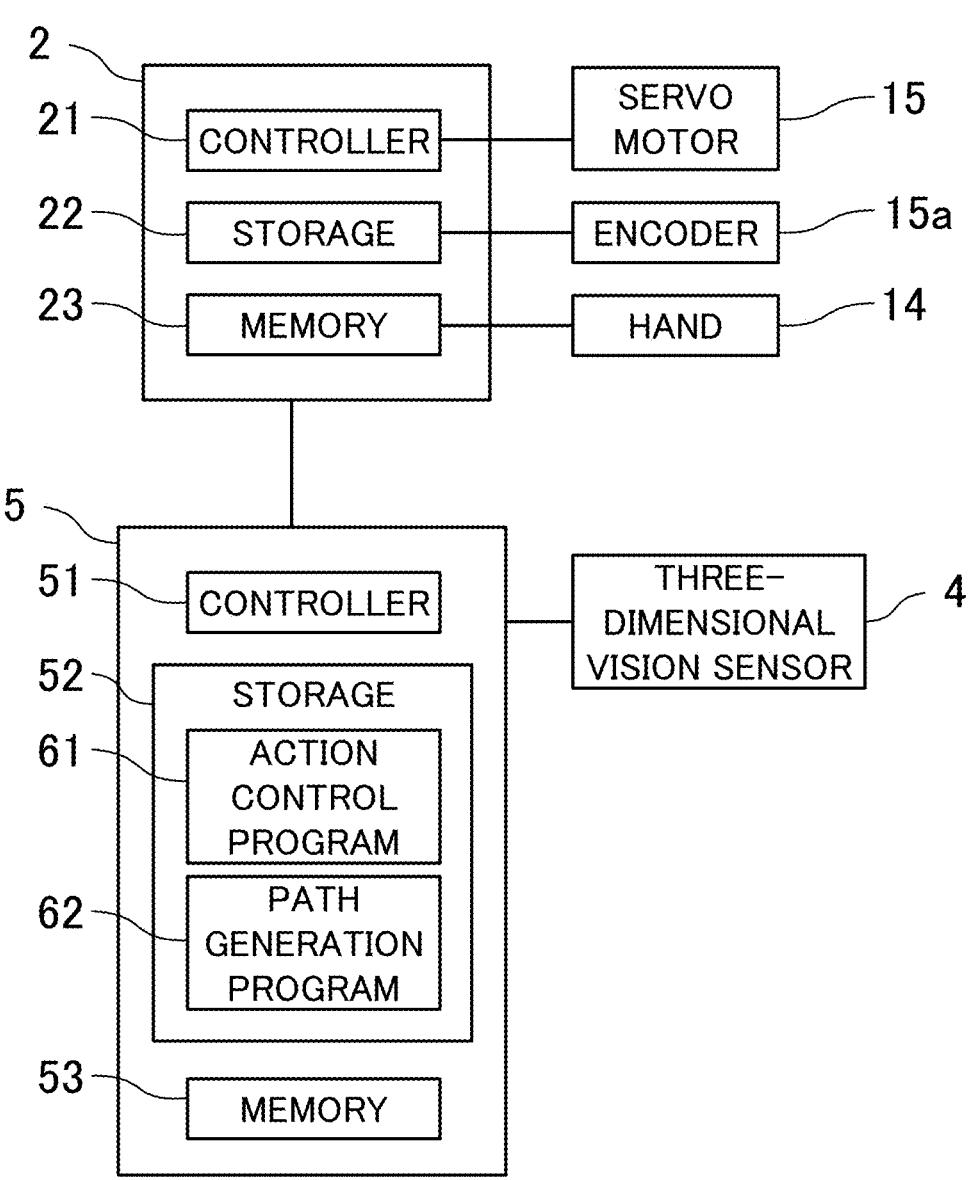
FIG. 2 illustrates a schematic hardware configuration of a robot controller and a controller.

FIG. 2 illustrates a schematic hardware configuration of the robot controller 2 and the controller 5. The robot controller 2 transmits and receives signals, instructions, and other data to/from the controller 5. The robot controller 2 controls the servo motors 15 and the hand 14 of the robot arm 12. For example, the robot controller 2 supplies a current to the servo motors 15 in accordance with an instruction of the controller 5. At this time, the robot controller 2 performs feedback control of the supplied current based on an output of the encoder 15a. The robot controller 2 opens and closes the two fingers 14a by controlling the actuator of the hand 14.

The robot controller 2 includes a controller 21, a storage 22, and a memory 23.

The controller 21 controls the entire robot controller 2. The controller 21 performs various computations. For example, the controller 21 is a processor such as a central processing unit (CPU). The controller 21 may be a micro controller unit (MCU), a micro processor unit (MPU), a field programmable gate array (FPGA), a programmable logic controller (PLC), system LSI, or the like.

The storage 22 stores programs and various types of data to be executed by the controller 21. The storage 22 is a nonvolatile memory, a hard disc drive (HDD), or a solid state drive (SSD), for example.

The memory 23 temporarily stores data or other information. For example, the memory 23 is a volatile memory.

The three-dimensional vision sensor 4 acquires space information on the layout space where the robot arm 12, that is, the robot 1, is located. The space information includes information on the position and shape of an object in the layout space. The three-dimensional vision sensor 4 acquires three-dimensional space information. For example, the three-dimensional vision sensor 4 measures the positions and shapes of the container 91 and an object in the container 91 from above the container 91. The three-dimensional vision sensor 4 outputs the positions and shapes of the container 91 and the object in the container 91 in the form of point group data. The three-dimensional vision sensor 4 outputs measurement results to the controller 5 as space information.

The controller 5 generates a path of the robot arm 12 and outputs an instruction for moving the robot arm 12 along the path to the robot controller 2. In this example, the controller 5 generates a path in which the robot arm 12 moves from a predetermined start position to a target position while avoiding interference with other objects. More specifically, the controller 5 causes the robot arm 12 to perform a pick and place action in which the robot arm 12 picks up a predetermined object A from the container 91 and conveys the object A to a placing table (not shown).

The controller 5 transmits and receives signal, information, and other data to/from the robot controller 2. The controller 5 receives detection results of the three-dimensional vision sensor 4. As illustrated in FIG. 2, the controller 5 includes a controller 51, a storage 52, and a memory 53. Although not shown, the controller 5 may further include an input operator that is operated by a user to perform setting or other operation regarding action generation, and a display that displays setting contents.

The controller 51 controls the entire controller 5. The controller 51 performs various computations. For example, the controller 51 is a processor such as a central processing unit (CPU). The controller 51 may be a micro controller unit (MCU), a micro processor unit (MPU), a field programmable gate array (FPGA), a programmable logic controller (PLC), system LSI, or the like.

The storage 52 stores programs and various types of data to be executed by the controller 51. For example, the storage 52 stores an action control program 61 for controlling an action of the robot arm 12, and a path generation program 62 for generating a path of the robot arm 12. The storage 52 is a nonvolatile memory, a hard disc drive (HDD), or a solid state drive (SSD), for example.

The memory 53 temporarily stores data or other information. For example, the memory 53 is a volatile memory.

Figure 3:
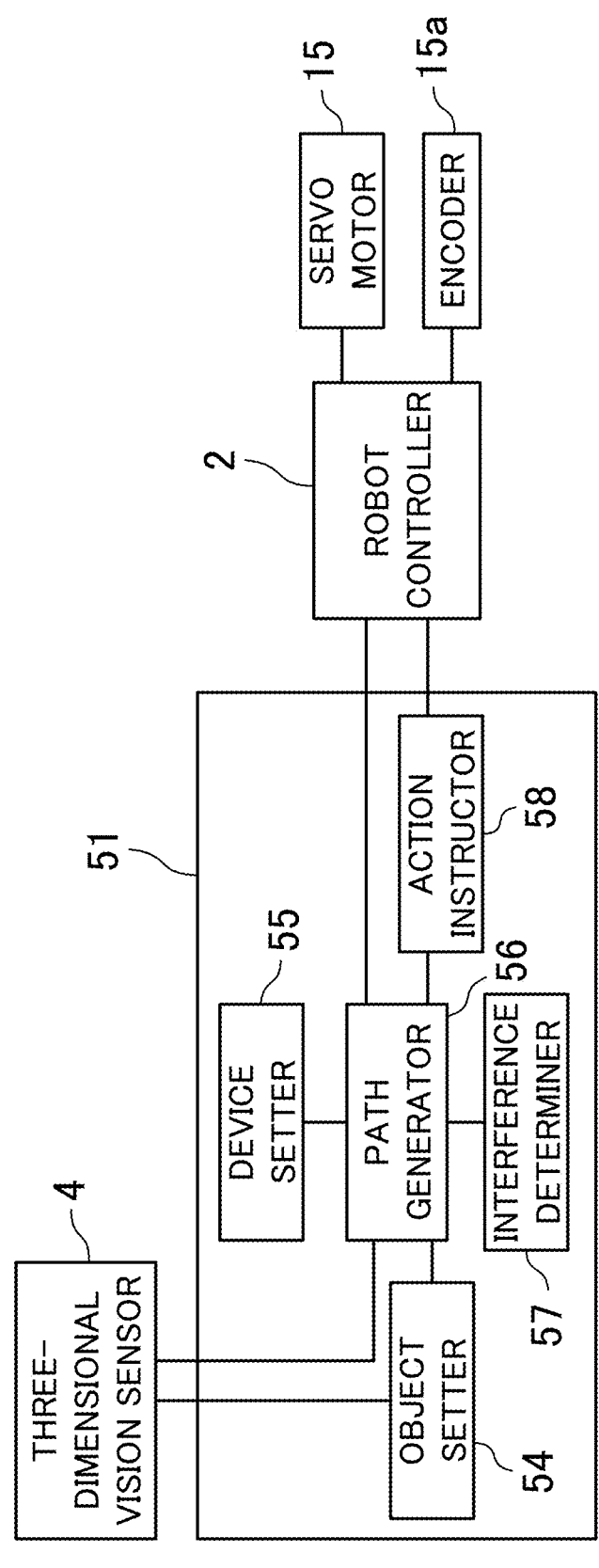
FIG. 3 is a block diagram illustrating a configuration of a control system of a controller.

FIG. 3 is a block diagram illustrating a configuration of a control system of the controller 51. The controller 51 reads the path generation program 62 from the storage 52 and develops the program to the memory 53 to thereby operate various functions. Specifically, the controller 51 functions as an object setter 54, a device setter 55, a path generator 56, an interference determiner 57, and an action instructor 58.

The object setter 54 sets an object model 71 that is a model of an object included in the layout space where the robot arm 12 is located. In this example, the object model 71 is a point group model formed of point groups. In this example, the container 91, the placing table, and an object in the container 91 correspond to objects included in the layout space. The object setter 54 generates the object model 71 for each of the objects such as the container 91. The object setter 54 can change the density of point groups of the object model 71 for each object. Hereinafter, the "density" means the density of point groups unless otherwise specified. For example, the object setter 54 performs downsampling of point group data output from the three-dimensional vision sensor 4 and generates an object model 71 to thereby generate object models 71 with different densities of point groups. The object setter 54 can change the density of some of the point groups of the object model 71. The object setter 54 can also change the density of all the point groups of the object model 71.

Figure 4:
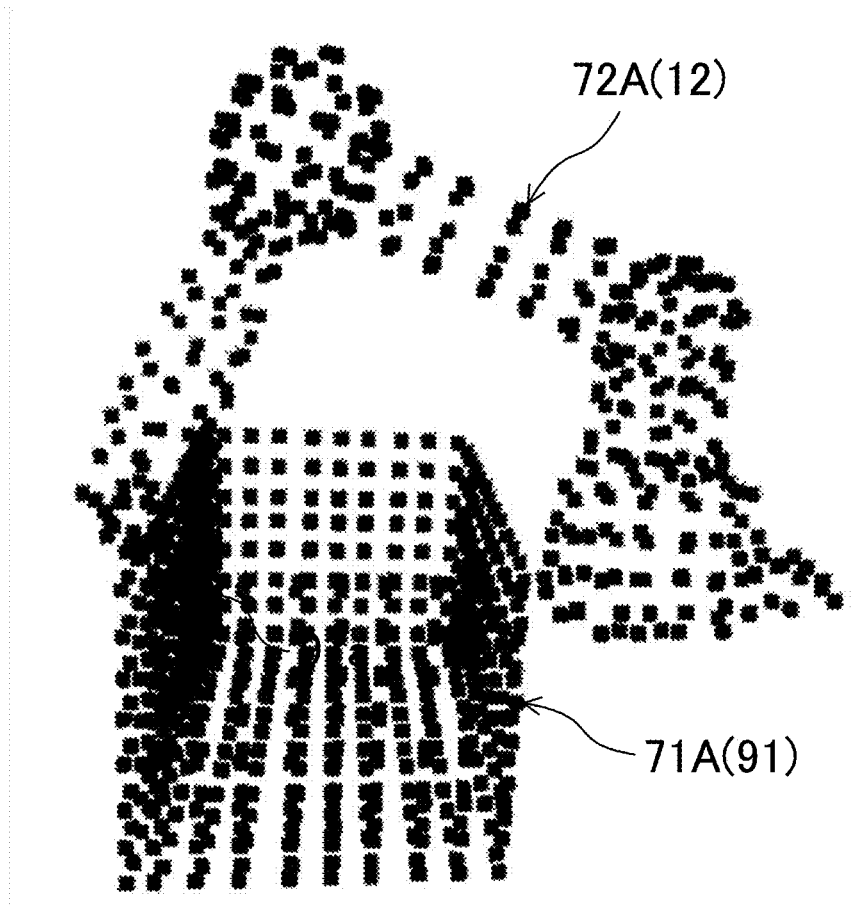
FIG. 4 illustrates examples of an object model and a device model.

In this example, the object setter 54 changes the density of point groups of the object model 71 in three stages: a predetermined first density; a second density higher than the first density; and a third density higher than the second density. The object setter 54 changes the density of some of the point groups of the object model 71. Hereinafter, the object model 71 in which the highest density of point groups is the first density will be referred to as a "first object model 71A," the object model 71 in which the highest density of point groups is the second density will be referred to as a "second object model 71B," and the object model 71 in which the highest density of point groups is the third density will be referred to as a "third object model 71C." When the first object model 71A, the second object model 71B, and the third object model 71C are not distinguished from one another, these models are referred to simply as "object models 71." FIG. 4 illustrates examples of the object model 71 and the device model 72. FIG. 4 shows the object model 71 of the container 91 in the object models 71. FIG. 4 shows the first object model 71A of the container 91.

The path generator 56 generates a path of the robot arm 12 stepwise. In this example, the path generator 56 generates one or more intermediate positions (i.e., nodes) between the start position and the target position of the robot arm 12 to thereby generate paths from the start position to the target position by way of the one or more intermediate positions. Here, since the robot arm 12 has multiple degrees of freedom, the position of the robot arm 12 is uniquely determined based on the positions of the joints and fingertips of the hand 14, and can be regarded as a posture of the robot arm 12 (i.e., the start position can be regarded as a start posture, the target position can be regarded as a target posture, and the intermediate position can be regarded as an intermediate posture). The path of the robot arm 12 is defined based on the positions of the joints and the positions of the fingertips of the hand 14, that is, based on rotation angles of the joints.

For example, the path generator 56 sequentially generates intermediate positions of the robot arm 12 from the start position toward the target position. The generation of the intermediate positions can be regarded as generation of paths to the intermediate positions. The path generator 56 generates a new intermediate position at random or according to predetermined rules (constraints). Examples of the predetermined rules include approach of the robot arm 12 to the target position, movement of the robot arm 12 away from an object in a case where the robot arm 12 interferes with the object, and the upper limit of the amount of movement of each of the joints and the fingertips of the hand 14. The path generator 56 may determine these rules comprehensively to generate intermediate positions.

The generated intermediate positions, that is, paths, are subjected to interference determination by the interference determiner 57. In accordance with a result of the interference determination, the path generator 56 selectively performs a change of intermediate positions (i.e., change of paths) and generation of a next intermediate position (i.e., generation of a next path).

The device setter 55 sets the device model 72 that is a model of the robot arm 12 in the layout space. In this example, the device model 72 is a point group model formed of point groups. The device setter 55 generates the device model 72 of the robot arm 12 located at an intermediate position generated by the path generator 56.

The device setter 55 can change the density of point groups of the device model 72. The device setter 55 can change the density of some of the point groups of the device model 72. The device setter 55 can also change the density of all the point groups of the device model 72.

The storage 52 stores point group data of the robot arm 12. The point group data of the robot arm 12 represents a shape, at least an outer shape, of the robot arm 12. Specifically, the point group data of the robot arm 12 includes point group data of each link. The storage 52 also stores point group data of the robot arm 12 with different densities. Specifically, the storage 52 stores point group data of the robot arm 12 with a predetermined first density, point group data of the robot arm 12 with a second density higher than the first density, and point group data of the robot arm 12 with a third density higher than the second density. The first density, the second density, and the third density of the point group data of the robot arm 12 are substantially the same as the first density, the second density, and the third density of the first object model 71A, the second object model 71B, and the third object model 71C, respectively.

The device setter 55 reads point group data of the robot arm 12 from the storage 52, and disposes the readout point group data at an intermediate position generated by the path generator 56. In this manner, the device setter 55 sets the device model 72 of the robot arm 12. At this time, the device setter 55 can change the density of the device model 72 by changing the point group data read out from the storage 52. The device setter 55 can also read point group data with different densities for each portion of the robot arm 12. The device setter 55 can generate the device model 72 whose density is uniform over the entire robot arm 12. Hereinafter, the device model 72 in which the highest density of the point groups is the first density will be referred to as a "first device model 72A," the device model 72 in which the highest density of the point groups is the second density will be referred to as a "second device model 72B," and the device model 72 in which the highest density of the point groups is the third density will be referred to as a "third device model 72C." When the first device model 72A, the second device model 72B, and the third device model 72C are not distinguished from one another, these models are referred to simply as "device models 72." FIG. 4 illustrates the first device model 72A where the entire robot arm 12 is formed of point group data with the first density.

The interference determiner 57 performs interference determination on the object model 71 and the device model 72 after having moved along a path (i.e., located at a generated intermediate position), based on the distance between the object model 71 and the device model 72. Here, since the object model 71 and the device model 72 are point group models, the distance between the object model 71 and the device model 72 is the distance between a point included in the point groups of the object model 71 and a point included in the point groups of the device model 72. The interference determiner 57 performs interference determination by sequentially using point group models in order from the model with the lowest density. The interference determiner 57 performs interference determination by using the object model 71 and the device model 72 with low densities, and if it is determined that there is no possibility of interference, the interference determiner 57 finishes the interference determination, whereas if it is determined that there is a possibility of interference, the interference determiner 57 increases the density of the point groups of at least one of the object model 71 or the device model 72 and performs interference determination again.

Specifically, if the inter-model distance that is a minimum distance between the object model 71 and the device model 72 is less than or equal to a predetermined safety threshold, the interference determiner 57 determines that there is a possibility of interference between the object model 71 and the device model 72. On the other hand, if the inter-model distance is larger than the safety threshold, the interference determiner 57 determines that there is no possibility of interference between the object model 71 and the device model 72. In addition, if the interference determiner 57 determines that there is no possibility of interference, the interference determiner 57 obtains a margin distance that is a value obtained by subtracting the safety threshold from the inter-model distance.

Here, a portion of the object model 71 and a portion of the device model 72 that are closest to each other are portions defining the inter-model distance, that is, a minimum distance. In this example, since the object model 71 and the device model 72 are point group models, a point in the object model 71 and a point in the device model 72 that are closest to each other define the inter-model distance. These points will be referred to as "closest points." That is, the closest point of the object model 71 and the closest point of the device model 72 define the inter-model distance.

If the inter-model distance is less than or equal to the safety threshold, the interference determiner 57 determines whether or not the inter-model distance is less than or equal to an interference threshold smaller than the safety threshold. If the inter-model distance is less than or equal to the interference threshold, the interference determiner 57 determines that the object model 71 and the device model 72 interfere with each other.

That is, the interference determiner 57 determines one of that there is a possibility of interference, that there is no possibility of interference, and that there is interference, based on the distance between the object model 71 and the device model 72. If there is a possibility of interference, the interference determiner 57 increases the density of point groups of at least one of the object model 71 or the device model 72 and performs similar interference determination.

For example, first, the interference determiner 57 performs interference determination on the first object model 71A and the first device model 72A. If there is a possibility of interference, the interference determiner 57 then performs interference determination on the second object model 71B and the second device model 72B. If there is still a possibility of interference, the interference determiner 57 further performs interference determination on the third object model 71C and the third device model 72C.

At this time, each of the second object model 71B and the second device model 72B does not need to have the second density as a whole. That is, only some point groups including the closest point in the second object model 71B may have the second density with the other point groups having the first density. Alternatively, only some point groups including the closest points in the second device model 72B may have the second density with the other point groups having the first density. Similarly, in interference determination on the third object model 71C and the third device model 72C, only some point groups including the closest point in the third object model 71C may have the third density with the other point groups having the first density or the second density. Alternatively, only some point groups including the closest point in the third device model 72C may have the third density with the other point groups having the first density or the second density.

In interference determination on the first object model 71A and the first device model 72A, if the interference determiner 57 determines that there is no possibility of interference or that there is interference, the interference determiner 57 finishes the interference determination. The same holds for interference determination on the second object model 71B and the second device model 72B. The same also holds for interference determination on the third object model 71C and the third device model 72C.

In interference determination on the object model 71 with the highest density (i.e., third object model 71C) and the device model 72 with the highest density (i.e., third device model 72C), the interference determiner 57 performs only determination based on the interference threshold. That is, if the inter-model distance between the third object model 71C and the third device model 72C is less than or equal to the interference threshold, the interference determiner 57 determines that there is interference, whereas if the inter-model distance between the third object model 71C and the third device model 72C is larger than the interference threshold, the interference determiner 57 determines that there is no possibility of interference.

In addition, the safety threshold for interference determination can be changed depending on the point group model, that is, the density of point groups. For example, as the density of point groups of the point group model increases, the safety threshold is set to be smaller. In this example, a first safety threshold that is a safety threshold for interference determination on the first object model 71A and the first device model 72A is larger than a second safety threshold that is a safety threshold for interference determination on the second object model 71B and the second device model 72B.

On the other hand, the interference threshold for interference determination may be the same even when the density of point groups is changed. In this example, the interference threshold is uniform in interference determination on the first object model 71A and the first device model 72A, interference determination on the second object model 71B and the second device model 72B, and interference determination on the third object model 71C and the third device model 72C.

In changing the density of the point group model in interference determination, the density of only one of the object model 71 or the device model 72 may be changed. For example, in the case of increasing the densities of point groups of the first object model 71A and the first device model 72A, only the first object model 71A may be changed to the second object model 71B with the first device model 72A unchanged. As long as the density of point groups of at least one of the object model 71 or the device model 72 is increased, interference determination may be performed with combinations of the object model 71 and the device model 72 with various densities.

If the interference determiner 57 determines that there is no possibility of interference, the path generator 56 generates a next intermediate position, that is, a next path. On the other hand, if the interference determiner 57 determines that there is a possibility of interference, the path generator 56 changes the intermediate position, that is, the path. The path generator 56 is also subjected to interference determination by the interference determiner 57 for the next intermediate position or the intermediate position after the change.

In addition, in the case of generating an intermediate position (i.e., path), if a margin distance of an intermediate position preceding to a current intermediate position is larger than the amount of movement of the device model 72 to the current intermediate position, the path generator 56 omits, that is, skips, interference determination on the current intermediate position, and generates a next intermediate position. That is, if the inter-model distance in interference determination of a previous intermediate position is suffi- ciently larger than the amount of movement of the device model 72 to the current intermediate position, the path generator 56 is not subjected to interference determination by the interference determiner 57 for the current intermedi- ate position, and generates a next intermediate position.

The path generator 56 repeats the process described above to thereby generate an intermediate position, that is, a path, from the start position to the target position stepwise. When the path generator 56 finishes generation of the path from the start position to the target position, the path generator 56 outputs information on the generated path to the action instructor 58.

The action instructor 58 generates an instruction value in accordance with the information on the path output from the path generator 56, and outputs the generated instruction value to the robot controller 2.

The robot controller 2 drives the servo motors 15 based on the instruction value from the action instructor 58. At this time, the robot controller 2 performs feedback control on a supply current to the servo motors 15 based on detection results of the encoder 15a. Accordingly, the robot arm 12 moves from the start position to the target position along the path generated by the path generator 56.

Figure 5:
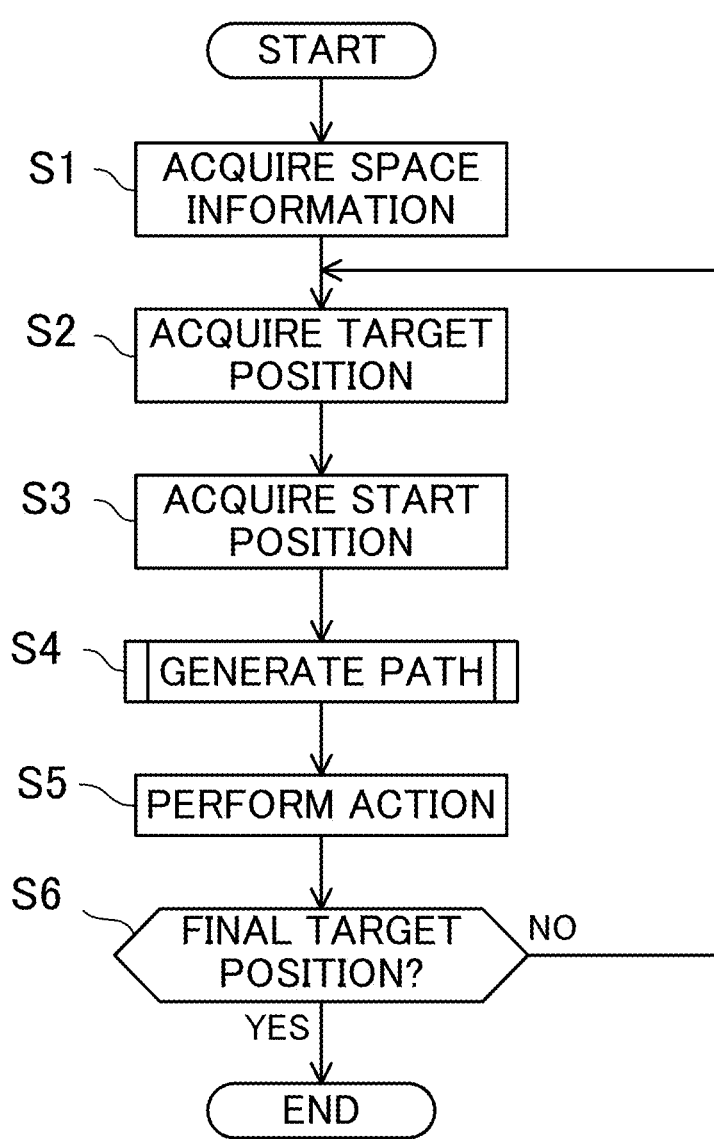
FIG. 5 is a flowchart depicting action control of a robot arm by the controller.

An action of the thus-configured robot system 100 will now be described. FIG. 5 is a flowchart depicting action control of the robot arm 12 by the controller 5. A pick and place action in which the robot arm 12 picks up a predeter- mined object A from the container 91 and conveys the object A to the placing table will be described. The controller 5 causes the robot arm 12 to perform the pick and place action as two actions: a first action performed until the robot arm 12 picks up the object A; and a second action in which the robot arm 12 conveys the object A from the container 91 to the placing table. This action control is executed by reading the action control program 61 from the storage 52 to the memory 53 and developing the program by the controller 51.

First, the controller 51 causes the robot arm 12 to perform the first action until the robot arm 12 picks up the object A. In step S1, the controller 51 acquires space information through the three-dimensional vision sensor 4. The three- dimensional vision sensor 4 measures positions and shapes of the container 91, the placing table, and the object in the container 91 from above the container 91 and the placing table. The three-dimensional vision sensor 4 outputs the positions and the shapes of the container 91, the placing table, and the object in the container 91 to the controller 5 in the form of point group data.

Next, in step S2, the controller 51 acquires a target position of the robot arm 12. Specifically, first, the path generator 56 detects a position of the object A based on the space information of the three-dimensional vision sensor 4. Then, the path generator 56 obtains a position of the robot arm 12 in the state of holding the object A at the detected position without interference with other objects, and sets the obtained position as a target position.

Subsequently, in step S3, the controller 51 acquires a start position of the robot arm 12. Specifically, the path generator 56 obtains a current position of the robot arm 12 based on detection results of the encoders 15a, and sets the obtained current position as a start position. The path generator 56 can obtain rotation angles of the joints from detection results of the encoders 15a. Dimensions of the links and the hand of the robot arm 12 are known. Thus, the path generator 56 can obtain positions of parts of the robot arm 12 based on the rotation angles of the joints and the dimensions of the links and the hand.

Thereafter, in step S4, the path generator 56 generates a path of the robot arm 12 from the start position to the target position. In step S4, a path generation process is performed, and a path is generated.

In step S5, the controller 51 causes the robot arm 12 to perform an action. Specifically, the action instructor 58 generates an instruction value for moving the robot arm 12 along the path output from the path generator 56, and outputs the instruction value to the robot controller 2. Based on the instruction value, the robot controller 2 controls the servo motors 15 and causes the robot arm 12 to perform an action. The robot arm 12 moves along the path.

In step S6, the controller 51 determines whether the target position is a final target position or not. That is, as in the pick and place action, an action is divided and includes multiple target positions in some cases. In step S6, it is determined whether the current target position is the final target position or not, that is, whether or not there remains a target position to be set next. In this process, since the second action remains after completion of the first action, it is determined that the current target position is not the final target position.

If the current target position is the final target position, the controller 51 finishes action control of the robot arm 12. If the action includes only one target position, the current target position is, of course, the final target position.

If the current target position is not the final target position, the controller 51 returns to step S2 and repeats the process from step S2. In step S2, a new target position of a next action is set, and processes in step S3 and subsequent steps are executed. In the process at this time, the controller 51 sets the target position of the robot arm 12 in the second action as a new target position. Specifically, the path generator 56 obtains a position of the robot arm 12 in the state of placing the object A on the placing table without interference with other objects, and sets the obtained position as a new target position.

In this manner, the target position of the robot arm 12 is updated. Then, in regard to the new target position, processes from step S3 to step S6 are repeated. In the current process, the robot arm 12 finally moves to the target position in the second action, and places the object A on the placing table.

When the robot arm 12 has reached the new target position, the controller 51 determines whether the target position is the final target position or not again in step S7. The process described above is repeated until the target position is the final target position. In the current process, since the target position in the second action is the final target position, the controller 51 finishes action control of the robot arm 12.

Figure 6:
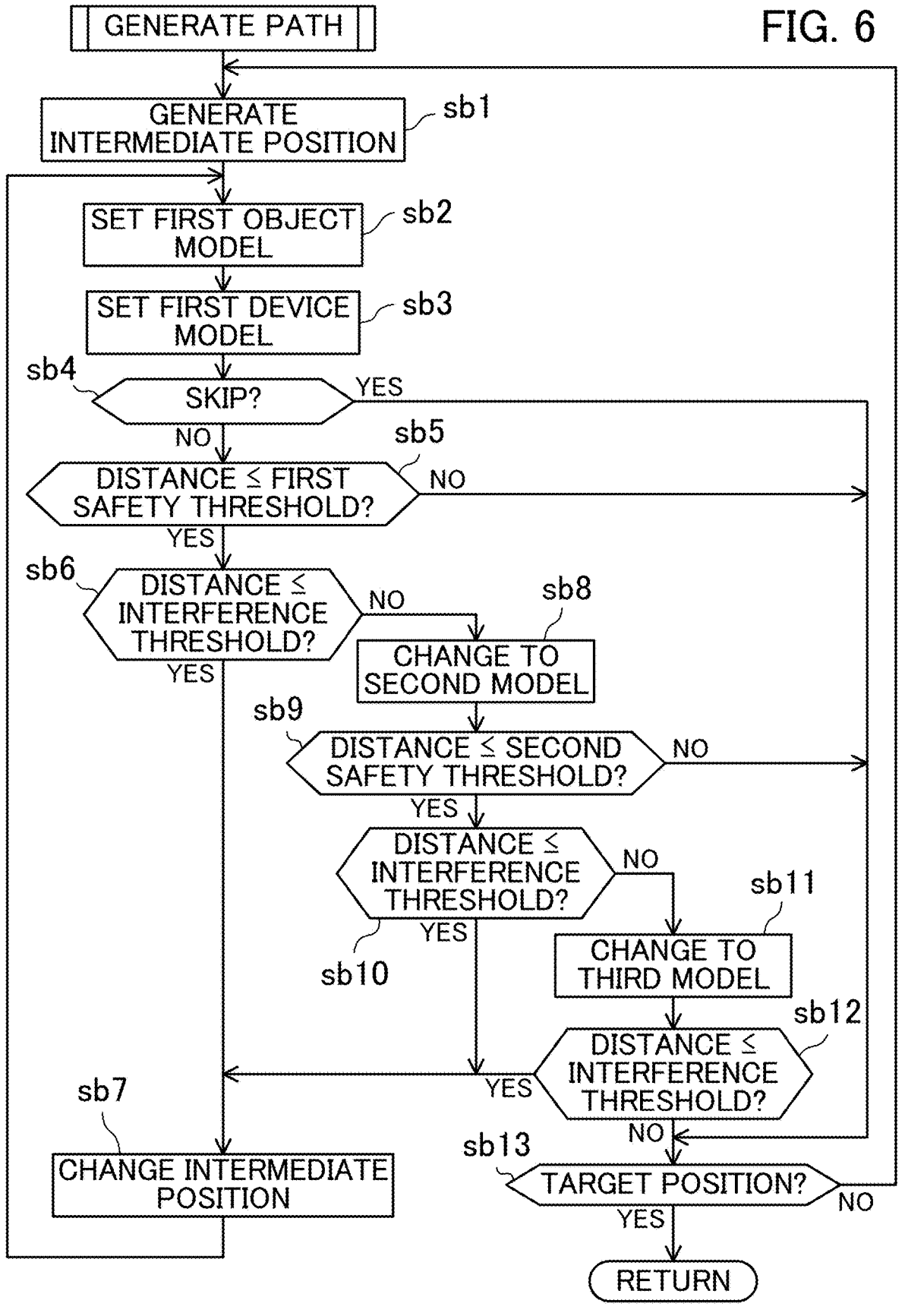
FIG. 6 is a flowchart depicting a path generation process of the robot arm by the controller.

Subsequently, a path generation process will be described. FIG. 6 is a flowchart depicting a path generation process of the robot arm 12 by the controller 5. The path generation process is executed by reading the path generation program 62 from the storage 52 and developing the program in the memory 53 by the controller 51.

First, in step sb1, the path generator 56 generates a path of the robot arm 12. In first step sb1 in the path generation process, the path generator 56 generates an intermediate position through which the robot arm 12 first passes from the start position. As described above, the path generator 56 generates an intermediate position at random or according to predetermined rules (constraints). The generation of the intermediate position can be regarded as generation of a path to the intermediate position. Hereinafter, a "current" intermediate position or path refers to a latest intermediate position or path generated in step sb1.

Next, in step sb2, the object setter 54 generates a first object model 71A that is the object model 71 of the object included in the layout space of the robot arm 12 and is the object model 71 with the lowest density. The entire first object model 71A is formed of point groups with the first density. In this example, the object setter 54 generates the first object model 71A of each of the container 91, the placing table, and the object in the container 91.

In step sb3, the device setter 55 generates a first device model 72A that is the device model 72 of the robot arm 12 in the layout space and is the device model 72 with the lowest density. The entire first device model 72A is formed of point groups with the first density. At this time, the device setter 55 generates the device model 72 of the robot arm 12 located at the current intermediate position.

Thereafter, in step sb4, the interference determiner 57 determines whether interference determination is to be skipped or not. Specifically, if the storage 52 stores a margin distance of an intermediate position preceding to the current intermediate position, the interference determiner 57 determines whether the margin distance is larger than the amount of movement of the first device model 72A to the current intermediate position or not. In first step sb4 in the path generation process, since the storage 52 does not store a margin distance of a previous intermediate position, the interference determiner 57 determines not to skip interference determination. A specific process in step sb4 will be described later.

If interference determination is not skipped, in step sb5, the interference determiner 57 determines whether an inter-model distance between the first object model 71A and the first device model 72A is less than or equal to a first safety threshold or not. The first safety threshold is an inter-model distance with which the first object model 71A and the first device model 72A are presumed not to interfere with each other with the densities of the first object model 71A and the first device model 72A. Basically, the interference determiner 57 calculates a distance between two points in all the combinations of a point included in the first object model 71A and a point included in the first device model 72A, and obtains a minimum distance between the two points, that is, an inter-model distance. The interference determiner 57 determines whether the obtained inter-model distance is less than or equal to the first safety threshold or not. It should be noted that if a distance between any two points is less than or equal to the first safety threshold, even when calculation of all the distances between two points is not completed, the interference determiner 57 can determine that the inter-model distance is less than or equal to the first safety threshold.

At this time, if the storage 52 stores an attention portion described later, the interference determiner 57 calculates a distance between two points with respect to points corresponding to the attention portion with priority, that is, calculates points corresponding to the attention portion first, in points included in the first object model 71A and points included in the first device model 72A. The attention portion is a portion having a possibility of interference, and is a portion where the possibility that the distance between two points is less than or equal to the first safety threshold is higher than those in the other portion. Thus, the determination on whether the inter-model distance is less than or equal to the first safety threshold or not is finished early, and a load in calculating a distance between two points is reduced in some cases.

In this example, the interference determiner 57 obtains an inter-model distance for each of the links of the robot arm 12, and compares the inter-model distance with the first safety threshold for each link. The links here include the hand 14. That is, an inter-model distance is obtained and it is determined whether the inter-model distance is less than or equal to the first safety threshold or not, in each of the first link 12a, the second link 12b, the third link 12c, the fourth link 12d, the fifth link 12e, and the hand 14. The interference determiner 57 determines whether the inter-model distance of at least one of the links is less than or equal to the first safety threshold or not. The first safety threshold may be uniform among the links, or may be different from one another among the links.

The interference determiner 57 sequentially obtains the inter-model distance and compares the obtained inter-model distance with the first safety threshold in order from one of the links at the front end of the robot arm 12. In this case, the interference determiner 57 sequentially compares the inter-model distances with the first safety threshold in order from the link at the front end, and if the inter-model distance of any one of the links is less than or equal to the first safety threshold, it is possible to determine that the inter-model distance of at least one of the links is less than or equal to the first safety threshold without performing calculation of, for example, the inter-model distance for the other links.

Although specifically described later, if the storage 52 stores a link for which interference determination is omitted, the interference determiner 57 does not perform interference determination (i.e., calculation of the inter-model distance, comparison of the inter-model distance with the safety threshold, etc.) of this link.

If the inter-model distance is larger than the first safety threshold, the interference determiner 57 determines that there is no possibility of interference between the first object model 71A and the first device model 72A. If it is determined that there is no possibility of interference, the current intermediate position is fixed as one intermediate position, that is, one path, from the start position to the target position. At this time, the interference determiner 57 determines a value obtained by subtracting the first safety threshold from the inter-model distance as a margin distance, and stores this value in the storage 52. In this manner, interference determination on the current intermediate position, that is, path, is completed.

In the example of obtaining the inter-model distance for each link, since the interference determiner 57 compares the inter-model distance with the first safety threshold for each link, if the inter-model distance of each of the links is larger than the first safety threshold, the interference determiner 57 determines that there is no possibility of interference. The interference determiner 57 obtains a margin distance for each link and stores the margin distances for the links in the storage 52.

Thereafter, in step sb13, the path generator 56 determines whether the path has reached the target position or not. Specifically, the path generator 56 determines whether the current intermediate position is an intermediate position preceding the target position or not. If the current intermediate position is the intermediate position preceding the target position, the path generator 56 determines that the path has reached the target position, and returns to the flow of action control of the robot arm 12 (i.e., step S5) shown in FIG. 5. On the other hand, if the current intermediate position is not the intermediate position preceding the target position, the path generator 56 returns to step sb1 and generates a next intermediate position.

In step sb1, the path generator 56 generates a next intermediate position, that is, a path, subsequent to the fixed intermediate position (hereinafter referred to as "preceding intermediate position"). Subsequently, in step sb2, the first object model 71A is set. If the object model 71 already generated is the first object model 71A, the object setter 54 uses this first object model 71A as it is. In next step sb3, the device setter 55 generates the first device model 72A of the robot arm 12 located at a new intermediate position.

In next step sb4, the path generator 56 determines whether to skip interference determination or not. If the margin distance at the preceding intermediate position preceding to the current intermediate position is stored in the storage 52, the path generator 56 determines whether the margin distance is larger than the amount of movement of the first device model 72A to the current intermediate position or not. The amount of movement of the first device model 72A to the current intermediate position is the amount of movement of the closest point (i.e., portion closest to the first object model 71A) of the first device model 72A to the preceding intermediate position when the first device model 72A moves from the preceding intermediate position to the current intermediate position.

If the margin distance is larger than the amount of movement of the first device model 72A, interference determination is omitted, that is, interference determination is skipped. In step sb13, the path generator 56 determines whether the path has reached the target position or not. If the path has reached the target position, the path generator 56 returns to the flow of action control of the robot arm 12 (i.e., step S5) shown in FIG. 5. On the other hand, if the path has not reached the target position yet, the path generator 56 returns to step sb1, and generates a next intermediate position. In this manner, the path generator 56 skips interference determination on the current intermediate position, fixes the current intermediate position, and performs a subsequent process.

If the margin distance is larger than the amount of movement of the first device model 72A to the current intermediate position, the possibility that the inter-model distance is larger than the first safety threshold is also high in interference determination on the first device model 72A at the current intermediate position. That is, if interference determination is not skipped, it is expected that after calculation of the inter-model distance in step sb5, a process to the step sb13 is performed. Thus, by skipping interference determination by the interference determiner 57, calculation of the inter-model distance at the current intermediate position can be omitted.

In a case where the process returns to step sb4 again through steps sb1, sb2, and sb3 after skipping of the interference determination, since the margin distance at the preceding intermediate position is not stored in the storage 52, the interference determiner 57 calculates an inter-model distance between the first object model 71A and the first device model 72A at a new intermediate position and determines whether the inter-model distance is less than or equal to the first safety threshold or not in step sb5. If the inter-model distance is larger than the first safety threshold, the interference determiner 57 determines that there is no possibility of interference as described above, and fixes the current intermediate position, and stores the current margin distance in the storage 52. The process returns to step sb1, and the path generator 56 generates a next intermediate position.

Figure 7:
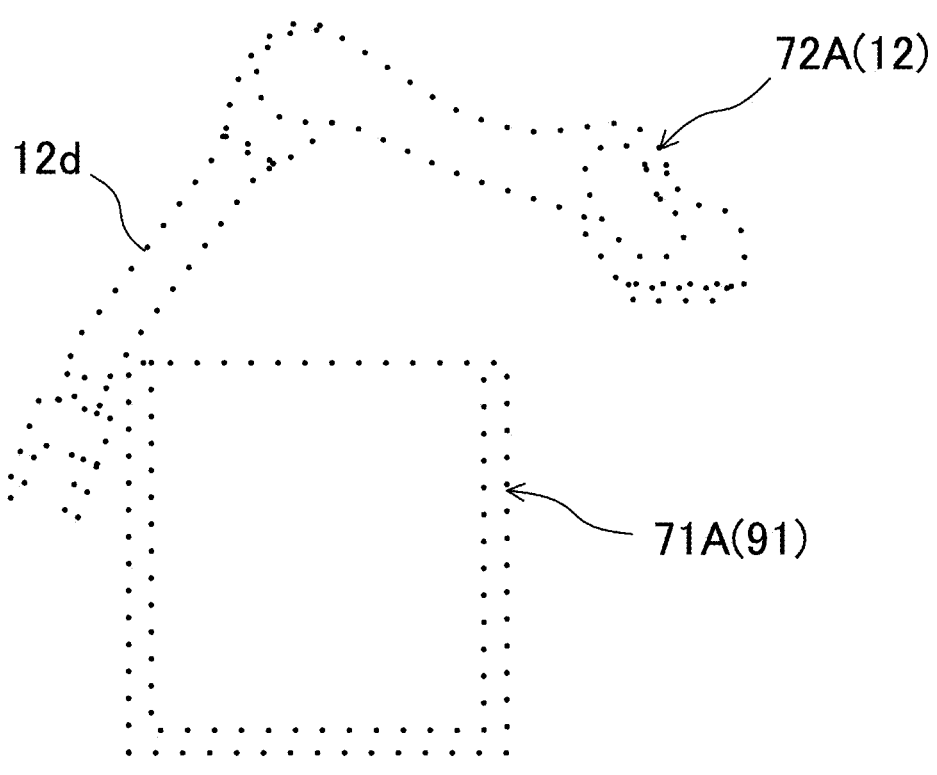
FIG. 7 is a schematic view illustrating a state where a first device model approaches a first object model.

In a case where a path of the robot arm 12 is generated from the start position apart from the object, the process described above is repeated until the first device model 72A approaches any first object model 71A, and intermediate positions, that is, paths, are sequentially generated from the start position toward the target position. Then, when the first device model 72A approaches the first object model 71A, the inter-model distance can be less than or equal to the first safety threshold. FIG. 7 is a schematic view illustrating a state where the first device model 72A approaches the first object model 71A. FIG. 7 shows the first object model 71A of the container 91 and the first device model 72A of the robot arm 12.

In the example of obtaining the inter-model distance for each link, in step sb4, the path generator 56 determines whether to omit, that is, skip, interference determination for a path or not for each link. That is, the path generator 56 determines whether the margin distance is larger than the amount of movement of the first device model 72A to the current intermediate position or not for each of the links. The amount of movement of the first device model 72A to the current intermediate position is the amount of movement of the closest point of each link. If the margin distance is larger than the amount of movement of the first device model 72A in all the links, interference determination is omitted, that is, skipped, as the entire robot arm 12, and the path generator 56 proceeds to step sb13. On the other hand, if the margin distance is larger than the amount of movement of the first device model 72A not in all the links but in some links, the path generator 56 does not omit interference determination as the entire robot arm 12. In this case, the path generator 56 stores links for which interference determination is omitted, in the storage 52. Thereafter, in step sb5, if the storage 52 stores a link for which interference determination is omitted, the interference determiner 57 omits interference determination of the link (i.e., calculation of the inter-model distance, comparison of the inter-model distance with the safety threshold, etc.). In the robot arm 12, the movable range differs among the links, and thus, the possibility of interference with the object also differs among the links. Accordingly, interference determination is omitted for a link showing a low possibility of interference with the object because of a sufficient inter-model distance, and is performed only on the other links. In this manner, a load of, for example, calculation of the inter-model distance is reduced.

In step sb5, if the inter-model distance is less than or equal to the first safety threshold, the interference determiner 57 determines that there is a possibility of interference between the first object model 71A and the first device model 72A. The interference determiner 57 stores portions of the first object model 71A and the first device model 72A in predetermined ranges including the closest points thereof, in the storage 52 as attention portions. That is, the storage 52 stores a pair of attention portions: the attention portion in the first object model 71A and the attention portion in the first device model 72A. The closest points can be regarded as portions that are determined to have possibilities of interference. If a distance between any two points is less than or equal to the first safety threshold, the interference determiner 57 stores, as a pair of attention portions, portions in predetermined ranges including two points between which a distance is less than or equal to the first safety threshold in the first object model 71A and the first device model 72A, in the storage 52.

In the example of obtaining the inter-model distance for each link, since the interference determiner 57 compares the inter-model distance with the first safety threshold for each link, if the inter-model distance of at least one of the links is less than or equal to the first safety threshold, the interference determiner 57 determines that there is a possibility of interference. Then, the portion in the predetermined range including the closest point of the link whose inter-model distance is less than or equal to the first safety threshold and a corresponding portion in the predetermined range including the closest point of the first object model 71A are stored in the storage 52 as a pair of attention portions. At this time, in a case where there are links in each of which the inter-model distance is less than or equal to the first safety threshold, a portion in a predetermined range including the closest point in each link where the inter-model distance is less than or equal to the first safety threshold and a corresponding portion including the closest point of the first object model 71A are stored in the storage 52 as attention portions. That is, pairs of attention portions are stored in the storage 52.

If the inter-model distance is less than or equal to the first safety threshold, the interference determiner 57 determines whether the inter-model distance is less than or equal to the interference threshold or not in step sb6. The interference threshold is smaller than the first safety threshold. The interference threshold is common to the interference threshold used in interference determination on the second object model 71B and the second device model 72B and interference determination on the third object model 71C and the third device model 72C. The interference threshold is an inter-model distance with which the third object model 71C and the third device model 72C are presumed to interfere with each other with the densities of the third object model 71C and the third device model 72C.

If the inter-model distance is less than or equal to the interference threshold, the interference determiner 57 determines that the first object model 71A and the first device model 72A interfere with each other. If a distance between any two points is less than or equal to the interference threshold, even when calculation of all the distances between two points is not completed, the interference determiner 57 can determine that the inter-model distance is less than or equal to the interference threshold. Accordingly, interference determination on the current intermediate position, that is, path, is finished.

In step sb7, the path generator 56 changes the intermediate position generated in step sb1. The path generator 56 may generate an intermediate position again such that at least the device model 72 moves away from the object model 71. Thereafter, the process returns to step sb2. In step sb2, if the object model 71 already generated is the first object model 71A, the object setter 54 uses this first object model 71A as it is. In subsequent step sb3, the device setter 55 generates the first device model 72A of the robot arm 12 at the intermediate position after the change. In step sb4 that is the first step after the path change in step sb7, the interference determiner 57 determines not to skip interference determination. Thereafter, as described above, the interference determiner 57 determines whether the inter-model distance is less than or equal to the first safety threshold or not (step sb5), and if necessary, determines whether the inter-model distance is less than or equal to the interference threshold or not (step sb6).

Figure 8:
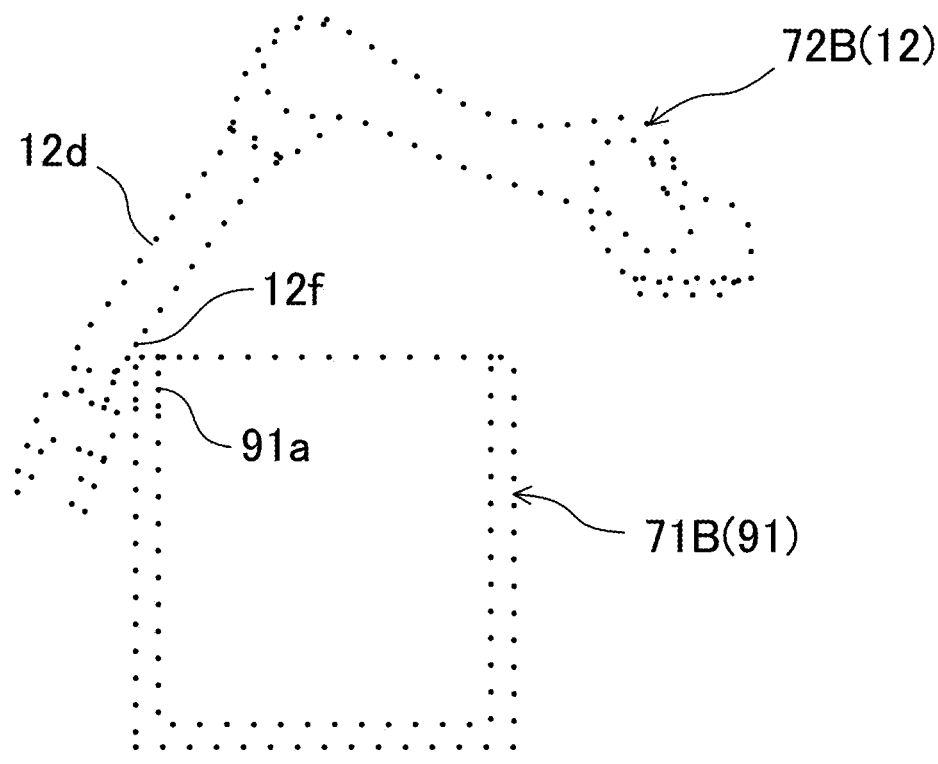
FIG. 8 is a schematic view illustrating a state where the first object model and the first device model in FIG. 7 are changed to a second object model and a second device model.

On the other hand, if the inter-model distance is larger than the interference threshold, in step sb8, the object setter 54 and the device setter 55 respectively increment the densities of the object model 71 and the device model 72 by one stage. The process proceeds to step sb8 in a case where the inter-model distance is larger than the interference threshold and less than or equal to the first safety threshold. That is, this case is a case where it cannot be determined whether the first object model 71A and the first device model 72A interfere with each other or not and it can only be determined that there is a possibility of interference. Thus, the interference determiner 57 performs interference determination in further detail by using the object model 71 and the device model 72 with densities incremented by one stage. Specifically, the object setter 54 changes the first object model 71A to the second object model 71B with a higher density, and the device setter 55 changes the first device model 72A to the second device model 72B with a higher density. It should be noted that the position of the second device model 72B is the same as the position of the first device model 72A. FIG. 8 is a schematic view illustrating a state where the first object model 71A and the first device model 72A in FIG. 7 are changed to the second object model 71B and the second device model 72B.

At this time, the object setter 54 increases the density of point groups in an attention portion of the object model 71. The attention portion of the object model 71 is a portion including the closest point that is a portion determined to have a possibility of interference in interference determination in step sb5, and is stored in the storage 52. In this example, as shown in FIG. 8, the object setter 54 forms a part 91a of a wall that is an attention portion of the container 91 of point groups with the second density, and forms the other part of point groups with the first density.

Similarly, the device setter 55 increases the density of point groups in an attention portion of the device model 72. The attention portion of the device model 72 is a portion including the closest point that is a portion determined to have a possibility of interference in interference determination in step sb5, and is stored in the storage 52. In the example of FIG. 8, the device setter 55 forms a part 12f of the fourth link 12d that is an attention portion of the robot arm 12 of point groups with the second density, and forms the other portion of point groups with the first density.

If the inter-model distance is larger than the interference threshold and less than or equal to the first safety threshold in the links of the robot arm 12, the object setter 54 increases the densities of point groups in attention portions of the object model 71, and the device setter 55 increases the densities of point groups in attention portions of the device model 72.

Then, in step sb9, the interference determiner 57 determines whether the inter-model distance between the second object model 71B and the second device model 72B is less than or equal to the second safety threshold or not.

The second safety threshold is an inter-model distance with which the second object model 71B and the second device model 72B are presumed not to interfere with each other with the densities of the second object model 71B and the second device model 72B. The second safety threshold is smaller than the first safety threshold and larger than the interference threshold. That is, since the second safety threshold is a threshold for determining a possibility of interference of the second object model 71B and the second device model 72B with densities higher than the first object model 71A and the first device model 72A, the second safety threshold is set to be smaller than the first safety threshold for more precise determination.

The interference determiner 57 calculates a distance between two points of a point included in the second object model 71B and a point included in the second device model 72B, and obtains an inter-model distance. At this time, calculation of the distance between two points in the second object model 71B and the second device model 72B is performed on point groups with the second density, that is, on points included in the attention portion. Calculation of the distance between two points is not performed on points in point groups not having the second density in the points included in the second object model 71B and the second device model 72B. This is because attention portions of the second object model 71B and the second device model 72B are portions determined to have a possibility of interference. By performing the calculation of the distance between two points as described above, the amount of calculation can be reduced. In this example, the interference determiner 57 calculates a distance between two points of a point included in the part 91a of the wall of the container 91 in the second object model 71B and a point included in the part 12f of the fourth link 12d in the second device model 72B.

The interference determiner 57 updates portions in predetermined ranges including the closest points in the second object model 71B and the second device model 72B as attention portions, and stores these portions in the storage 52.

If the inter-model distance is larger than the second safety threshold, the interference determiner 57 determines that there is no possibility of interference between the second object model 71B and the second device model 72B. If it is determined that there is no possibility of interference, the current intermediate position is fixed as one intermediate position, that is, one path, from the start position to the target position. At this time, the interference determiner 57 determines a value obtained by subtracting the second safety threshold from the inter-model distance as a margin distance, and stores this value in the storage 52. In this manner, interference determination on the current intermediate position, that is, path, is completed.

Thereafter, in step sb13, the path generator 56 determines whether the path has reached the target position or not. If the path has reached the target position, the path generator 56 returns to the flow of action control of the robot arm 12 (i.e., step S5) shown in FIG. 5. On the other hand, if the path has not reached the target position yet, the path generator 56 returns to step sb1, and generates a next intermediate position.

On the other hand, if the inter-model distance is less than or equal to the second safety threshold, the interference determiner 57 determines that there is a possibility of interference between the second object model 71B and the second device model 72B. It should be noted that if a distance between any two points is less than or equal to the second safety threshold, even when calculation of all the distances between two points is not completed, the interference determiner 57 can determine that the inter-model distance is less than or equal to the second safety threshold. In such a case, the interference determiner 57 updates portions in the predetermined ranges including two points between which the distance is less than or equal to the second safety threshold as attention portions in the second object model 71B and the second device model 72B, and stores these portions in the storage 52.

If the inter-model distance is less than or equal to the second safety threshold, the interference determiner 57 determines whether the inter-model distance is less than or equal to the interference threshold or not in step sb10. As described above, the interference threshold is equal to the interference threshold in the case of determination in step sb6.

If the inter-model distance is less than or equal to the interference threshold, the interference determiner 57 determines that the second object model 71B and the second device model 72B interfere with each other. If a distance between any two points is less than or equal to the interference threshold, even when calculation of all the distances between two points is not completed, the interference determiner 57 can determine that the inter-model distance is less than or equal to the interference threshold. Accordingly, interference determination on the current intermediate position, that is, path, is finished.

In step sb7, the path generator 56 changes the intermediate position generated in step sb1. Processes in step sb7 and subsequent steps are similar to those in the case where the inter-model distance is less than or equal to the interference threshold in interference determination on the first object model 71A and the first device model 72A. Since the process returns to steps sb2 and sb3 after step sb7, interference determination is performed from the first object model 71A and the first device model 72A with respect to the intermediate position after the change.

Figure 9:
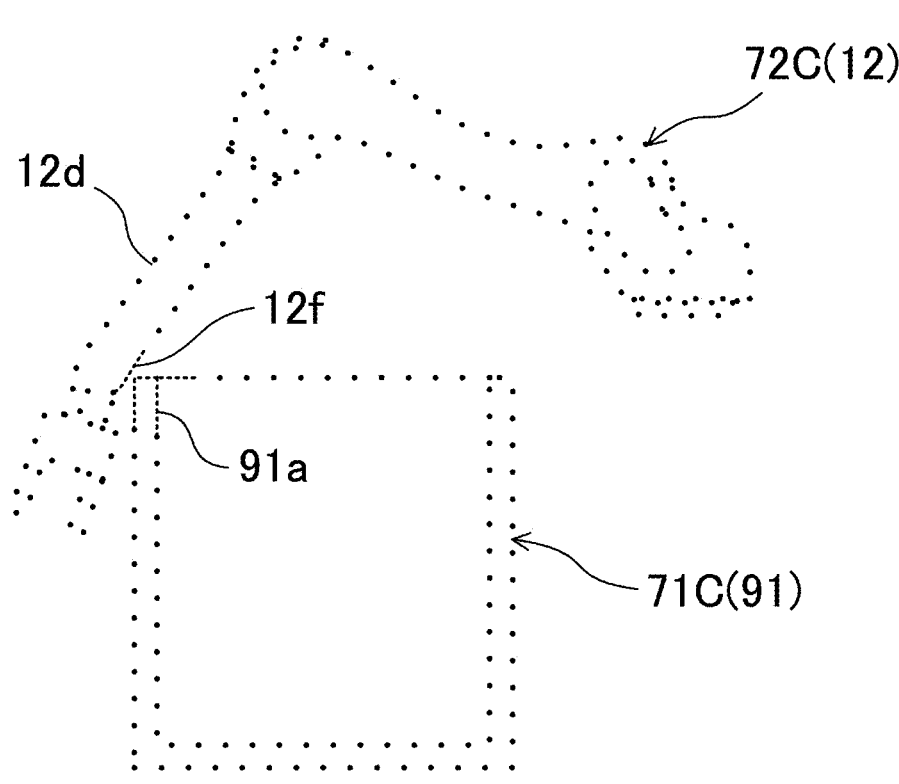
FIG. 9 is a schematic view illustrating a state where the second object model and the second device model in FIG. 8 are changed to a third object model and a third device model.

On the other hand, if the inter-model distance is larger than the interference threshold, in step sb11, the object setter 54 and the device setter 55 respectively increment the densities of the object model 71 and the device model 72 by one stage. The process proceeds to step sb11 in a case where the inter-model distance is larger than the interference threshold and less than or equal to the second safety threshold. That is, this case is a case where it cannot be determined whether the second object model 71B and the second device model 72B interfere with each other or not and it can only be determined that there is a possibility of interference. Thus, the interference determiner 57 performs interference determination by using the object model 71 and the device model 72 with densities incremented by one stage. Specifically, the object setter 54 changes the second object model 71B to the third object model 71C with a higher density, and the device setter 55 changes the second device model 72B to the third device model 72C with a higher density. It should be noted that the position of the third device model 72C is the same as the position of the second device model 72B. FIG. 9 is a schematic view illustrating a state where the second object model 71B and the second device model 72B in FIG. 8 are changed to the second object model 71C and the second device model 72C.

At this time, the object setter 54 increases the density of point groups in an attention portion of the object model 71. The attention portion of the object model 71 is a portion including the closest point that is a portion determined to have a possibility of interference in interference determination in step sb9, and is stored in the storage 52. In this example, as shown in FIG. 9, the object setter 54 forms a part 91a of a wall that is an attention portion of the container 91 of point group with the third density, and forms the other part of point groups with the first density.

Similarly, the device setter 55 increases the density of point groups in the attention portion of the device model 72. The attention portion of the device model 72 is a portion including the closest point that is a portion determined to have a possibility of interference in interference determination in step sb9, and is stored in the storage 52. In the example of FIG. 9, the device setter 55 forms a part 12f of the fourth link 12d that is an attention portion of the robot arm 12 of point groups with the third density, and forms the other portion of point groups with the first density.

Then, in step sb12, the interference determiner 57 determines whether the inter-model distance between the third object model 71C and the third device model 72C is less than or equal to the interference threshold or not. As described above, the interference threshold is equal to the interference threshold in the case of determination in steps sb6 and sb10.

The interference determiner 57 calculates a distance between two points of a point included in the third object model 71C and a point included in the third device model 72C, and obtains an inter-model distance. At this time, calculation of the distance between two points in the third object model 71C and the third device model 72C is performed on point group with the third density, that is, on points included in the attention portion. Calculation of the distance between two points is not performed on points in point groups not having the third density in the points included in the third object model 71C and the third device model 72C. This is because attention portions of the third object model 71C and the third device model 72C are portions determined to have a possibility of interference. By performing the calculation of the distance between two points as described above, the amount of calculation can be reduced. In this example, the interference determiner 57 calculates a distance between two points of a point included in the part 91a of the wall of the container 91 in the third object model 71C and a point included in the part 12f of the fourth link 12d in the third device model 72C.

The interference determiner 57 updates portions in predetermined ranges including the closest points in the third object model 71C and the third device model 72C as attention portions, and stores these portions in the storage 52.

If the inter-model distance is larger than the interference threshold, the interference determiner 57 determines that there is no possibility of interference between the third object model 71C and the third device model 72C. If it is determined that there is no possibility of interference, the current intermediate position is fixed as one intermediate position, that is, one path, from the start position to the target position. At this time, the interference determiner 57 determines a value obtained by subtracting the interference threshold from the inter-model distance as a margin distance, and stores this value in the storage 52. In this manner, interference determination on the current intermediate position, that is, path, is completed.

Thereafter, in step sb13, the path generator 56 determines whether the path has reached the target position or not. If the path has reached the target position, the path generator 56 returns to the flow of action control of the robot arm 12 (i.e., step S5) shown in FIG. 5. On the other hand, if the path has not reached the target position yet, the path generator 56 returns to step sb1, and generates a next intermediate position.

On the other hand, if the inter-model distance is less than or equal to the interference threshold, the interference determiner 57 determines that the third object model 71C and the third device model 72C interfere with each other. If a distance between any two points is less than or equal to the interference threshold, even when calculation of all the distances between two points is not completed, the interference determiner 57 can determine that the inter-model distance is less than or equal to the interference threshold. Accordingly, interference determination on the current intermediate position, that is, path, is finished.

In step sb7, the path generator 56 changes the intermediate position generated in step sb1. Processes in step sb7 and subsequent steps are similar to those in the case where the inter-model distance is less than or equal to the interference threshold in interference determination on the first object model 71A and the first device model 72A. Since the process returns to steps sb2 and sb3 after step sb7, interference determination is performed from the first object model 71A and the first device model 72A with respect to the intermediate position after change.

In this manner, interference determination is sequentially performed on the generated intermediate position, that is, path, in order from the object model 71 and the device model 72 with lower densities. Specifically, first, using the first object model 71A and the first device model 72A, it is determined whether or not the inter-model distance is larger than the first safety threshold, is less than or equal to the first safety threshold and larger than the interference threshold, or is less than or equal to the interference threshold. If the inter-model distance is larger than the first safety threshold, it is determined that there is no possibility of interference in the generated path, and a next path is generated. If the inter-model distance is less than or equal to the interference threshold, it is determined that interference occurs in the generated path, and the path is changed. If the inter-model distance is less than or equal to the first safety threshold and larger than the interference threshold, it is determined that there is a possibility of interference.

If it is determined that there is a possibility of interference, to determine whether interference is present or not in further detail, interference determination is performed using the object model 71 and the device model 72 with densities incremented by one stage. That is, by using the second object model 71B and the second device model 72B, it is determined whether or not the inter-model distance is larger than the second safety threshold, is less than or equal to the second safety threshold and larger than the interference threshold, or is less than or equal to the interference threshold. If the inter-model distance is larger than the second safety threshold, it is determined that there is no possibility of interference in the generated path, and a next path is generated. If the inter-model distance is less than or equal to the interference threshold, it is determined that interference occurs in the generated path, and the path is changed. If the inter-model distance is less than or equal to the second safety threshold and larger than the interference threshold, it is determined that there is a possibility of interference.

If it is determined that there is a possibility of interference, to determine whether interference is present or not in further detail, interference determination is performed using the object model 71 and the device model 72 with densities further incremented by one stage. That is, by using the third object model 71C and the third device model 72C, it is determined whether or not the inter-model distance is larger than the interference threshold, or is less than or equal to the interference threshold. Since the third object model 71C and the third device model 72C are the models having the highest densities, it is determined only whether the inter-model distance is less than or equal to the interference threshold or not. If the inter-model distance is larger than the interference threshold, it is determined that there is no possibility of interference in the generated path, and a next path is generated. If the inter-model distance is less than or equal to the interference threshold, it is determined that interference occurs in the generated path, and the path is changed.

Such interference determination is performed based on the inter-model distance between the object model 71 and the device model 72. The inter-model distance is obtained by calculating a distance between a point included in the object model 71 and a point included in the device model 72. Thus, as the number of points included in the point group model increases, the amount of calculation increases, and a calculation time increases.

On the other hand, the path generator 3 performs interference determination on the generated path by using the first object model 71A and the first device model 72A with lower densities, and if there is no possibility of interference, finishes the interference determination and fixes the path, and if it is determined that there is a possibility of interference, changes the models to the second object model 71B and the second device model 72B with higher densities and performs interference determination again. Accordingly, since interference determination is performed by sequentially using the object models 71 and the device models 72 in order from those having lower densities, when interference determination using the first object model 71A and the first device model 72A with lower densities shows the presence/absence of interference, the amount of calculation of a distance between a point included in the first object model 71A and a point included in the first device model 72A is reduced. On the other hand, with the use of the object model 71 with a low density, accuracy of interference determination decreases. On the other hand, if interference determination using the first object model 71A and the first device model 72A cannot determine the presence/absence of interference, the path generator 3 determines that there is a possibility of interference, and changes the first object model 71A and the first device model 72A to the second object model 71B and the second device model 72B with higher densities and performs interference determination again. The use of the second object model 71B and the second device model 72B with higher densities enables interference determination to be performed with higher accuracy. In this manner, the interference determination of the path generator 3 can achieve both reduction of the time for interference determination and enhancement of accuracy.

In this example, the path generator 3 sets the density of the object model 71 in three stages. Specifically, the path generator 3 performs interference determination by sequentially using the first, second, and third object models 71A, 71B, and 71C with different densities and the first, second, and third device models 72A, 72B, and 72C with different densities in order from those with lower densities. In this manner, a balance between reduction of the time for interference determination and enhancement of accuracy can be obtained stepwise.

In addition, in the path generator 3, both the object model 71 and the device model 72 are point group models. Thus, calculation of a distance between the object model 71 and the device model 72 is calculation of a distance between two points. As a result, calculation of the distance between the object model 71 and the device model 72 is simplified.

In addition, the path generator 3 changes the density of the device model 72 in conformity with the density of the object model 71. Specifically, the device models 72 can be point group models with the first density, the second density, and the third density that sequentially increase in this order. In performing interference determination using the first object model 71A in order to provide priority to reduction of the amount of calculation, the first device model 72A whose highest density is the first density is used. In addition to using the first object model 71A with the lowest density, the use of the first device model 72A with the lowest density can reduce the amount of calculation of a distance between two points of a point included in the first object model 71A and a point included in the first device model 72A. In performing interference determination using the third object model 71C in order to provide priority to enhancement of accuracy of the interference determination, the third device model 72C whose highest density is the third density is used. In addition to using the third object model 71C with the highest density, the use of the third device model 72C with the highest density enables determination of interference between the third object model 71C and the third device model 72C to be performed with higher accuracy. In performing interference determination using the second object model 71B in order to obtain a balance between reduction of the amount of calculation and enhancement of accuracy in interference determination, the second device model 72B whose highest density is the second density is used. In addition to using the second object model 71B with the intermediate density, the use of the second device model 72B with the intermediate density can enhance accuracy in interference determination with reduction of a calculation load. In this manner, the tendency in increasing/reducing the density of the device model 72 is matched with the tendency in increasing/reducing the density of the object model 71 so that both reduction of the time for interference determination and enhancement of accuracy can be easily achieved.

As described above, the path generator 3 that generates a path of the robot arm 12 (mover) includes: the object setter 54 that sets the object model 71 as a model of an object included in a layout space where the robot arm 12 is located; the device setter 55 that sets the device model 72 as a model of the robot arm 12 in the layout space; the path generator 56 that generates a path of the robot arm 12 stepwise; and the interference determiner 57 that performs interference determination on the object model 71 and the device model 72 after having moved along the path, based on a distance between the object model 71 and the device model 72, wherein at least one of the object model 71 or the device model 72 is a point group model formed of point groups, if the interference determiner 57 determines that there is a possibility of interference, at least one of the object setter 54 or the device setter 55 increases a density of point groups of the point group model and the interference determiner 57 performs the interference determination again by using the point group model with the increased density of the point groups, and if the interference determiner 57 determines that there is no possibility of interference, the path generator 56 generates a next path.

In other words, the path generation method for generating a path of the robot arm 12 (mover) includes: setting the object model 71 as a model of an object included in a layout space where the robot arm 12 is located; setting the device model 72 as a model of the robot arm 12 in the layout space; generating a path of the robot arm 12 stepwise; and performing interference determination on the object model 71 and the device model 72 after having moved along the path, based on a distance between the object model 71 and the device model 72, wherein at least one of the object model 71 or the device model 72 is a point group model formed of point groups, if it is determined in the interference determination that there is a possibility of interference, a density of point groups of the point group model is increased in at least one of the setting the object model 71 or the setting the device model 72, and in the performing the interference determination, interference determination is performed again by using the point group model with the increased density of the point groups, and if it is determined in the interference determination that there is no possibility of interference, a next path is generated.

To generate an action of the robot arm 12 (mover), the path generation program 62 causes a computer to execute the functions of: setting the object model 71 as a model of an object included in a layout space where the robot arm 12 is located; setting the device model 72 as a model of the robot arm 12 in the layout space; generating a path of the robot arm 12 stepwise; and performing interference determination on the object model 71 and the device model 72 after having moved along the path, based on a distance between the object model 71 and the device model 72, wherein at least one of the object model 71 or the device model 72 is a point group model formed of point groups, if it is determined in the interference determination that there is a possibility of interference, at least the function of setting the object model 71 and the function of setting the device model 72 increases a density of the point groups in the point group model, and the function of performing interference determination performs the interference determination again by using the point group model with the increased density of the point groups, and if it is determined in the interference determination that there is no possibility of interference, the function of generating a path generates a new path.

With these configurations, a path of the robot arm 12 is generated stepwise. When the path is generated, interference determination is performed on the object model 71 and the device model 72 after having moved along the path. The interference determination is performed based on a distance between the object model 71 and the device model 72. At this time, at least one of the object model 71 or the device model 72 is a point group model. As a result of the interference determination, if it is determined that there is a possibility of interference, a density of the point groups of the point group model is increased, and the interference determination is performed again. If there is no possibility of interference, a next path is generated. In this manner, the interference determination is first performed by using a point group model with a relatively low density. Since the interference determination is performed based on the distance between the object model 71 and the device model 72, a load in calculating the distance is small in interference determination using a point group model with a low density. In the interference determination using the point group model with a low density, it can be determined that there is no possibility of interference in some cases. In such cases, a load in calculating the distance is reduced. On the other hand, in the interference determination using the point group model with a low density, if it is determined that there is a possibility of interference, interference determination is performed again by using a point group model with a high density. With the increased density of the point group model, the presence/absence of interference can be determined in further detail. As a result, both reduction of a load in calculating a distance and enhancement of accuracy in interference determination can be achieved.

Since at least one of the object model 71 or the device model 72 is a point group model, both the object model 71 and the device model 72 may be point group models, only the object model 71 may be a point group model, or only the device model 72 may be a point group model.

If the interference determiner 57 determines that there is a possibility of interference, at least one of the object setter 54 or the device setter 55 increases the density of some point groups of the point group model including a portion for which it is determined in the interference determination that there is a possibility of interference.

With this configuration, if it is determined that there is a possibility of interference, at least one of the object setter 54 or the device setter 55, that is, one of the object setter 54 and the device setter 55 that sets the point group model, increases not the density of all the point groups of the point group model but the density of some point groups of the point group model including the portion for which it is determined in the interference determination that there is a possibility of interference. Accordingly, it is possible to reduce the amount of process in increasing the density of the point group model by at least one of the object setter 54 or the device setter 55.

If the inter-model distance that is a minimum distance between the object model 71 and the device model 72 is less than or equal to the predetermined safety threshold, the interference determiner 57 determines that it is determined that there is a possibility of interference, whereas if the inter-model distance is larger than the safety threshold, the interference determiner 57 determines that there is no possibility of interference.

With this configuration, the presence/absence of possibility of interference is determined based on whether the inter-model distance between the object model 71 and the device model 72 is less than or equal to the safety threshold or not.

In addition, if the inter-model distance is less than or equal to the interference threshold smaller than the safety threshold, the interference determiner 57 determines that there is interference, and if the interference determiner 57 determines that there is interference, the path generator 56 changes the path.

With this configuration, the interference determiner 57 determines three states of: absence of possibility of interference; presence of possibility of interference; and presence of interference, based on the inter-model distance. Specifically, if the inter-model distance is larger than the safety threshold, it is determined that there is no possibility of interference, if the inter-model distance is less than or equal to the safety threshold and larger than the interference threshold, it is determined that there is a possibility of interference, and if the inter-model distance is less than or equal to the interference threshold, it is determined that there is interference.

If it is determined that there is no possibility of interference, a next path is generated, if it is determined that there is interference, the path is changed, and if it is determined that there is a possibility of interference, interference determination is performed again by using a point group model with a higher density. Such processes are repeated to thereby generate a path stepwise.

The safety threshold is set to be smaller as the density of point groups of the point group model increases.

With this configuration, interference determination can be performed by using an appropriate safety threshold in accordance with the density of the point groups of the point group model. That is, if the density of the point group model is low, the point group model is not precise, and in this case, the safety threshold is set relatively large. Accordingly, it is possible to prevent erroneous determination that there is no interference in spite of the presence of interference. On the other hand, if the density of the point group model is high, the point group model is precise, and in this case, the safety threshold is set relatively small. Since the point group model is precise, even when the safety threshold is set relatively small, the presence/absence of possibility of interference can be correctly determined.

The robot arm 12 as a mover includes links and joints coupling the links, and the interference determiner 57 obtains an inter-model distance for each of the links, determines that there is a possibility of interference if the inter-model distance of at least one of the links is less than or equal to the safety threshold, and determines that there is no possibility of interference if the inter-model distance of each of the links is larger than the safety threshold.

With this configuration, the inter-model distance is obtained for each link of the robot arm 12, the inter-model distance is compared with the safety threshold for each link, and it is determined whether there is a possibility of interference or not for each link.

In addition, the interference determiner 57 sequentially obtains the inter-model distance and compares the obtained inter-model distance with the safety threshold in order from one of the links near a front end of the robot arm 12.

With this configuration, the presence/absence of possibility of interference is determined in order from the link near the front end of the robot arm 12. In the robot arm 12, the link closer to the front end has a larger movable range, and thus, the link closer to the front end has a higher possibility of interference with the object. If there is any link having an inter-model distance less than or equal to the safety threshold, the interference determiner 57 determines that there is a possibility of interference. That is, any one of the links is found to have an inter-model distance less than or equal to the safety threshold, calculation of the inter-model distance, for example, can be omitted for the other links. The determination of the presence/absence of possibility of interference in order from the link near the front end enables a link having a possibility of interference to be found early, and a load in calculating the inter-model distance or other processes is more likely to be reduced.

If the interference determiner 57 determines that there is no possibility of interference, the interference determiner 57 obtains the margin distance that is a value obtained by subtracting the safety threshold from the inter-model distance, and in generating the path, if the margin distance of a preceding path preceding to a current path is larger than the amount of movement of the device model 72 in the current path, the path generator 56 omits the interference determination on the current path.

With this configuration, when the path generator 56 generates a new path, if the margin distance in interference determination on a previous path is larger than the amount of movement of the device model 72 along the new path, interference determination on the current path is omitted, and a next path is generated. Even when the device model 72 moves along the current path, the inter-model distance between the object model 71 and the device model 72 is likely to be larger than the safety threshold. In this manner, interference determination is skipped so that calculation load on interference determination is thereby reduced, and the entire process is simplified.

In addition, the robot arm 12 as a mover includes links and joints coupling the links, the interference determiner 57 obtains an inter-model distance for each of the links, determines that there is a possibility of interference if the inter-model distance of at least one of the links is less than or equal to the predetermined safety threshold, determines that there is no possibility of interference and obtains the margin distance for each of the links if the inter-model distance of each of the links is larger than the safety threshold, and in the case of generating a path, the path generator 56 determines whether to omit interference determination on the current path for each of the links.

With this configuration, a calculation load on interference determination can be further reduced. That is, in the configuration in which it is determined whether to omit interference determination or not in the entire robot arm 12 as the mover, even if a link for which interference determination can be omitted is included in the robot arm 12, as long as a link for which interference determination cannot be omitted is included in the robot arm 12, interference determination is not omitted as the robot arm 12. On the other hand, in the configuration of determining whether to omit interference determination or not for each of the links, if the robot arm 12 includes a link for which interference determination can be omitted and a link for which interference determination cannot be omitted, interference determination for the link for which interference determination can be omitted is omitted, and interference determination is performed only on the link for which interference determination cannot be omitted. Accordingly, calculation load on interference determination can be further reduced.

At least the object model 71 in the object model 71 and the device model 72 is a point group model.

With this configuration, interference determination using a point group model can also be easily achieved for an unknown object in the layout space. Specifically, in general, in the case of forming the device model 72 as a point group model, point group data of the device model 72 is prepared, that is, stored, beforehand in many cases. Thus, in the case of forming the device model 72 as the point group model, point group data needs to be prepared beforehand. On the other hand, information on an object in the layout space is acquired by a device for acquiring object information such as the three-dimensional vision sensor 4 in general. Such a device can easily acquire point group data of an object. Thus, in the case of forming the device model 72 as the point group model, point group data does not need to be prepared beforehand, and point group data can be acquired on site by the three-dimensional vision sensor 4 or other devices. Accordingly, interference determination using a point group model can also be easily achieved on an unknown object.

In addition, both the object model 71 and the device model 72 are point group models.

With this configuration, the distance between the object model 71 and the device model 72 is a distance between a point included in the object model 71 and a point included in the device model 72. That is, calculation of a distance is calculation of a distance between two points, and calculation itself is simplified. On the other hand, as the number of points included in each of the object model 71 and the device model 72 increases, a calculation load increases. On the other hand, as described above, interference determination is performed by sequentially using point group models in order from a point group model with a lower density so that a calculation load can be thereby reduced.

Furthermore, if the interference determiner 57 determines that there is a possibility of interference, the object setter 54 increases a density of the point groups of the object model 71, the device setter 55 increases a density of the point groups of the device model 72, and the interference determiner 57 performs interference determination on the device model 72 with the increased density of the point groups and the object model 71 with the increased density of the point groups.

With this configuration, if it is determined in the interference determination that there is a possibility of interference, densities of the point groups of both the object model 71 and the device model 72 are increased. That is, since when the density of the object model 71 is low, the density of the device model 72 is also low in order to reduce a calculation load, reduction of a calculation load is promoted. On the other hand, since when the object model 71 is high, the density of the device model 72 is also high in order to enhance accuracy in interference determination, enhancement of accuracy in interference determination is promoted.

The object setter 54 increases a density of some point groups of the object model 71 including a portion for which it is determined in the interference determination that there is a possibility of interference, and the device setter 55 increases a density of some point groups of the device model 72 including a portion for which it is determined in the interference determination that there is a possibility of interference.

With this configuration, if it is determined that there is a possibility of interference, the object setter 54 does not increase the density of all the point groups of the object model 71 but increases the density of some point groups of the object model 71 including a portion for which it is determined in the interference determination that there is a possibility of interference. Accordingly, the amount of processing in increasing the density of the object model 71 by the object setter 54 can be reduced. Similarly, if it is determined that there is a possibility of interference, the device setter 55 does not increase the density of all the point groups of the device model 72 but increases the density of some point groups of the device model 72 including a portion for which it is determined in the interference determination that there is a possibility of interference. Accordingly, the amount of processing in increasing the density of the device model 72 by the device setter 55 can be reduced.

OTHER EMBODIMENTS

In the foregoing description, the embodiments have been described as an example of the technique disclosed in the present application. The technique disclosed here, however, is not limited to these embodiments, and is applicable to other embodiments obtained by changes, replacements, additions, and/or omissions as necessary. Components described in the above embodiments may be combined as a new exemplary embodiment. Components included in the accompanying drawings and the detailed description can include components unnecessary for solving problems as well as components necessary for solving problems in order to exemplify the technique. Therefore, it should not be concluded that such unnecessary components are necessary only because these unnecessary components are included in the accompanying drawings or the detailed description.

For example, the mover is not limited to the robot arm 12 and the robot 1. Any device can be a mover as long as the device performs an action. For example, the mover may be a robot including no robot arms, such as a self-propelled robot. The mover may be a mobile object such as a drone. The robot 1 is not limited to an industrial robot.

The mover is not necessarily the robot arm 12, and may be the fingers 14a of the hand 14.

The point group data as a basis of the object model 71 generated by the object setter 54 is not limited to point group data output from the three-dimensional vision sensor 4. The object setter 54 may, for example, generate point group data from an RGB-D image output from an RGB-D camera. As well as the RGB-D image, the object setter 54 may generate point group data from an RGB image output from a stereo camera, or may generate point group data based on a depth image, a voxel, or other data.

The object setter 54 is not limited to the configuration that generates point group data based on data output from a device such as a sensor or a camera, and may generate the object model 71 based on point group data previously acquired and stored in the storage 52 or other devices.

One of the object model 71 or the device model 72 may not be a point group model. For example, the object setter 54 may generate the object model 71 as a point group model with the device setter 55 generating the device model 72 as a model other than a point group model. In contrast, the object setter 54 may generate the object model 71 as a model other than a point group model with the device setter 55 generating the device model 72 as a point group model. As an example of the model other than the point group model, if the device model 72 is a model other than a point group model, the device setter 55 may generate the device model 72 having an outer surface similar to that of an actual mover (in this example, robot arm 12). Alternatively, the device setter 55 may be the device model 72 obtained by approximating an outer shape of an actual mover to a cylinder or a polygon, the device model 72 obtained by a polygon, or the like. In this case, the distance between a point included in the object model and the device model is a distance between a point included in the object model and a plane in which the device model 72 is formed. The same holds for a case where the object setter 54 generates a model other than a point group model.

Although the object setter 54 changes the density of the object model 71 in three stages, the present disclosure is not limited to this example. The object setter 54 may change the density of the object model 71 in two stages or four or more stages. In changing the density of the object model 71, the object setter 54 may change not the density of only a portion of the object model 71 including an attention portion but the density of the entire object model 71.

Although the device setter 55 changes the density of the device model 72 in three stages, the present disclosure is not limited to this example. The device setter 55 may change the density of the device model 72 in two stages or four or more stages. The first density, the second density, and the third density of the device model 72 may not be approximately equal to the first density, the second density, and the third density, respectively, of the object model 71. In changing the density of the device model 72, the device setter 55 may change not the density of only a link including an attention portion of the device model 72 but the density of the entire robot arm 12. Alternatively, in changing the density of the device model 72, the device setter 55 may change not the density of the entire link including an attention portion but the density of only a portion including an attention portion in the link including the attention portion.

If it is determined in interference determination that there is a possibility of interference, it is sufficient that the density of at least the object model 71 is changed, and the density of the device model 72 does not need to be changed.

A path of the mover is not limited to a path in the pick and place action described above. The technique disclosed here is applicable to generation of a path in various actions of a mover.

Although the start position of a path is acquired from a detection result of the encoder 15*a*, the present disclosure is not limited to this example. Although the target position is acquired by image recognition of space information from the three-dimensional vision sensor 4 by an image recognition technique, the present disclosure is not limited to this example. The start position or the target position may be acquired by the controller 51 by receiving an input from the outside. For example, the controller 5 may include an operation receiver such as a touch panel such that a user can select a start position and/or a target position from an image of a layout space displayed on the touch panel. Alternatively, the start position and/or the target position may be previously determined and stored in the storage 52 or other devices.

Although the safety threshold is set to be smaller as the density of point groups of the object model 71 increases, the present disclosure is not limited to this example. That is, the first safety threshold does not need to be larger than the second safety threshold. For example, the first safety threshold may be equal to the second safety threshold.

Although the interference threshold is the same value in interference determination on the object models 71 with different densities, the present disclosure is not limited to this example. For example, the interference threshold may be set to decrease as the density of point groups of the object model 71 increases.

In skipping in step sb4 of the path generation process described above, if the margin distance is larger than the amount of movement of the first device model 72A to the current intermediate position, interference determination is skipped. This amount of movement of the first device model 72A to the current intermediate position is the amount of the closest point of the preceding first device model 72A when the first device model 72A moves from the preceding intermediate position to the current intermediate position, but the present disclosure is not limited to this example. The amount of movement of the first device model 72A in determination in this skip may be the maximum amount of movement of each portion (e.g., each of the joints and the fingertips of the hand 14) of the first device model 72A. Alternatively, as a rule for generating an intermediate position, if the upper limit of the amount of movement of each portion (each of the joints and the fingertips of the hand 14) of the device model 72, the upper limit may be used.

Skipping of interference determination in step sb4 may not be performed on a next intermediate position but may be performed on interference determination of next and subsequent intermediate positions. For example, if the margin distance is larger than the amount of movement of the first device model 72A to the next and subsequent intermediate positions, interference determination on these intermediate positions may be skipped.

The process of skipping interference determination in step sb4 may be omitted.

In the path generation process described above, in the case of changing the density of the object model 71 in two stages, steps sb9, sb11, and sb12 are omitted. That is, it is determined whether the inter-model distance between the second object model 71B and the second device model 72B is less than or equal to the interference threshold or not. It is not determined whether the inter-model distance is less than or equal to the second safety threshold or not. If the inter-model distance is less than or equal to the interference threshold, the intermediate position is changed in step sb7. If the inter-model distance is larger than the interference threshold, it is determined in step sb13 whether the path has reached the target position or not.

In the path generation process, if the density of the object model 71 is changed in four or more stages, in interference determination on the third object model 71C and the third device model 72C, it is also determined whether or not the inter-model distance is less than or equal to the safety threshold, that is, the third safety threshold, before determination on whether the inter-model distance is less than or equal to the interference threshold or not. In interference determination on the object model 71 and the device model 72 with highest densities, determination on whether the inter-model distance is less than or equal to the safety threshold or not is not performed, and determination on whether the inter-model distance is the interference threshold or not is performed.

In the flow charts described above, the controller 5 starts movement of the robot arm 12 after stepwise generation of the entire paths from the start position to the target position, but the present disclosure is not limited to this example. The controller 5 may move the robot arm 12 along a path for each fixing of the path generated stepwise from the start position to the target position.

In the flowchart described above, as long as predetermined processes are achieved, the order of steps may be replaced, steps may be processed in parallel, a step may be omitted, or a step may be added.

Functions of elements disclosed herein may be performed by using a circuit or a processing circuit including a general-purpose processor, a dedicated processor, an integrated circuit, an application specific integrated circuit (ASIC)

configured or programmed to perform disclosed functions, a conventional circuit, and/or a combination thereof. A processor includes a transistor and other circuits, and thus, are assumed to be a processing circuit or a circuit. In the present disclosure, a circuit, a unit, or a means is hardware that performed listed functions, or hardware programmed to perform listed functions. The hardware may be the hardware disclosed herein, or known hardware programmed or configured to perform listed functions. If the hardware is a processor considered as a type of a circuit, the circuit, means, or unit is a combination of hardware and software, and software is used for a configuration of hardware and/or a processor.

DESCRIPTION OF REFERENCE CHARACTERS 100 robot system
1 robot
12 robot arm (mover)
3 path generator
54 object setter
55 device setter
56 path generator
57 interference determiner
62 path generation program
71 object model
72 device model

The invention claimed is:

1. A path generator control system that generates a path of a mover, the path generator control system comprising:
   control circuitry configured to:
      set an object model as a model of an object included in a layout space where the mover is located;
      set a device model as a model of the mover in the layout space, at least one of the object model or the device model is a point group model formed of point groups;
      generate a path of the mover stepwise; and
      perform interference determination on the object model and the device model after having moved along the path, based on a distance between the object model and the device model, by:
      determining whether an inter-model distance, which is a minimum distance between a first object model with a first density and a first device model with the first density, is less than or equal to a first safety threshold;
      if the inter-model distance is larger than the first safety threshold, determining that there is no possibility of interference;
      if the inter-model distance is less than or equal to the first safety threshold, determining whether the inter-model distance is less than or equal to an interference threshold smaller than the first safety threshold;
      if the inter-model distance is less than or equal to the interference threshold, determining that there is interference and generating a different path; and
      if the inter-model distance is between the first safety threshold and the interference threshold, determining that there is a possibility of interference, increasing the density of the point groups of the first object model to a second density to form a second object model, and performing the interference determination again by determining whether an inter-model distance between the second object model and a second device model with the second density is less than or equal to a second safety threshold smaller than the first safety threshold.

2. The path generator control system according to claim 1, wherein the mover is a robot arm including links and joints coupling the links, and the control circuitry is configured to:
   obtain the inter-model distance for each of the links,
   determine that there is a possibility of interference if the inter-model distance of at least one of the links is less than or equal to the first safety threshold, and determine that there is no possibility of interference if the inter-model distance of each of the links is larger than the first safety threshold.

3. The path generator control system according to claim 2, wherein
   the control circuitry is configured to sequentially obtain the inter-model distance and compare the obtained inter-model distance with the first safety threshold in order from one of the links near a front end of the robot arm.

4. The path generator control system according to claim 1, wherein
   the control circuitry is further configured to:
   obtain a margin distance that is a value obtained by subtracting the first safety threshold from the inter-model distance if there is no possibility of interference, and
   omit the interference determination on the path if the margin distance of a preceding path preceding the path is larger than an amount of movement of the device model in the path.

5. The path generator control system according to claim 4, wherein
   the mover is a robot arm including links and joints coupling the links,
   the control circuitry is further configured to:
   obtain the inter-model distance for each of the links,
   determine that there is a possibility of interference if the inter-model distance of at least one of the links is less than or equal to the first safety threshold,
   determine that there is no possibility of interference and obtain the margin distance for each of the links if the inter-model distance of each of the links is larger than the first safety threshold, and
   determine whether to omit the interference determination on the path for each of the links.

6. The path generator control system according to claim 1, wherein the object model is the point group model.

7. The path generator control system according to claim 1, wherein both the object model and the device model are the point group models.

8. The path generator control system according to claim 7, wherein
   the control circuitry is further configured to, if there is a possibility of interference:
   increase a density of the point groups of the object model,
   increase a density of the point groups of the device model, and
   perform interference determination on the device model with the increased density of the point groups and the object model with the increased density of the point groups.

9. The path generator control system according to claim 8, wherein
   the control circuitry is further configured to:
   increase a density of some of the point groups of the object model including a portion for which it is determined in the interference determination that there is a possibility of interference, and increase a density of some of the point groups of the device model including a portion for which it is determined in the interference determination that there is a possibility of interference.

10. A path generation method for generating a path of a mover, the method comprising:

setting an object model as a model of an object included in a layout space where the mover is located;

setting a device model as a model of the mover in the layout space, at least one of the object model or the device model is a point group model formed of point groups;

generating a path of the mover stepwise; and performing interference determination on the object model and the device model after having moved along the path, based on a distance between the object model and the device model, by:

determining whether an inter-model distance, which is a minimum distance between a first object model with a first density and a first device model with the first density, is less than or equal to a first safety threshold;

when the inter-model distance is larger than the first safety threshold, determining that there is no possibility of interference;

when the inter-model distance is less than or equal to the first safety threshold, determining whether the inter-model distance is less than or equal to an interference threshold smaller than the first safety threshold;

when the inter-model distance is less than or equal to the interference threshold, determining that there is interference and generating a different path; and when the inter-model distance is between the first safety threshold and the interference threshold, determining that there is a possibility of interference, increasing the density of the point groups of the first object model to a second density to form a second object model, and performing the interference determination again by determining whether an inter-model distance between the second object model and a second device model with the second density is less than or equal to a second safety threshold smaller than the first safety threshold.

11. A non-transitory computer readable medium having computer-executable instructions stored thereon, which when executed by a processor, cause the processor to perform a method comprising:

setting an object model as a model of an object included in a layout space where the mover is located;

setting a device model as a model of the mover in the layout space, at least one of the object model or the device model is a point group model formed of point groups;

generating a path of the mover stepwise; and performing interference determination on the object model and the device model after having moved along the path, based on a distance between the object model and the device model, by:

determining whether an inter-model distance, which is a minimum distance between a first object model with a first density and a first device model with the first density, is less than or equal to a first safety threshold;

if the inter-model distance is larger than the first safety threshold, determining that there is no possibility of interference;

if the inter-model distance is less than or equal to the first safety threshold, determining whether the inter-model distance is less than or equal to an interference threshold smaller than the first safety threshold;

if the inter-model distance is less than or equal to the interference threshold, determining that there is interference and generating a different path;

if the inter-model distance is between the first safety threshold and the interference threshold, determining that there is a possibility of interference, increasing the density of the point groups of the first object model to a second density to form a second object model, and performing the interference determination again by determining whether an inter-model distance between the second object model and a second device model with the second density is less than or equal to a second safety threshold smaller than the first safety threshold.

12. The path generator according to claim 1, wherein the control circuitry is further configured to, if the inter-model distance between the second object model and the second device model is less than or equal to the interference threshold, determine that there is interference and generate the different path.

13. The path generator according to claim 1, wherein the control circuitry is further configured to, if the inter-model distance between the second object model and the second device model is larger than the interference threshold and less than or equal to the second safety threshold, determine that there is a possibility of interference, increase the density of the point groups of the second object model to a third density to form a third object model, increase the density of the point groups of the second device model to the third density to form a third device model, and perform the interference determination again by determining whether an inter-model distance between the third object model and the third device model is less than or equal to the interference threshold.

14. The path generator according to claim 13, wherein the control circuitry is further configured to, if the inter-model distance between the third object model and the third device model is larger than the interference threshold, determine that there is no possibility of interference and generate a next path.

15. The path generator according to claim 14, wherein the control circuitry is further configured to determine whether the path has reached a target position and, if the path has not reached the target position, generate the next path.

* * * * *